US012609859B2

(12) United States Patent
Tong et al.

(10) Patent No.: US 12,609,859 B2
(45) Date of Patent: Apr. 21, 2026

(54) COMMUNICATION METHOD AND APPARATUS

(71) Applicant: HUAWEI TECHNOLOGIES CO., LTD., Shenzhen (CN)

(72) Inventors: Jiajie Tong, Hangzhou (CN); Xianbin Wang, Hangzhou (CN); Huazi Zhang, Hangzhou (CN); Rong Li, Boulogne Billancourt (FR); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/732,486

(22) Filed: Jun. 3, 2024

(65) Prior Publication Data

US 2024/0333576 A1     Oct. 3, 2024

Related U.S. Application Data

(63) Continuation of application No. PCT/CN2022/129947, filed on Nov. 4, 2022.

(30) Foreign Application Priority Data

Dec. 2, 2021     (CN) .......................... 202111464150.4

(51) Int. Cl.
| | |
|---|---|
| *H04L 23/02* | (2006.01) |
| *H04L 27/34* | (2006.01) |
| *H04L 27/36* | (2006.01) |

(52) U.S. Cl.
CPC ........ *H04L 27/366* (2013.01); *H04L 27/3444* (2013.01); *H04L 27/361* (2013.01)

(58) Field of Classification Search
CPC ....... H04L 5/12; H04L 1/0057; H04L 1/0009; H04L 1/0041; H04L 25/03178;
(Continued)

(56) References Cited

U.S. PATENT DOCUMENTS

| | | | |
|---|---|---|---|
| 6,785,342 B1* | 8/2004 | Isaksen ................... | H04L 27/34 375/284 |
| 2006/0140299 A1* | 6/2006 | Jin ....................... | H04L 27/3433 375/261 |

(Continued)

FOREIGN PATENT DOCUMENTS

WO     2016145493 A1     9/2016

*Primary Examiner* — Khai Tran

(57) ABSTRACT

A communication method and apparatus is provided so that a fading channel can implement a good error correction capability. This helps improve information transmission reliability. The method includes: a transmit end device determines, based on N bit sets, a first sequence and a second sequence that are obtained through quadrature amplitude modulation QAM. The first sequence includes N in-phase components, and the second sequence includes N quadrature components; or the first sequence includes N quadrature components, and the second sequence includes N in-phase components, where N is an integer greater than or equal to 2. Then, the transmit end device performs interleaving processing on the first sequence, to obtain a third sequence. Then, the transmit end device sends, to a receive end device, a symbol sequence determined based on the second sequence and the third sequence. The symbol sequence includes N QAM symbols.

15 Claims, 10 Drawing Sheets

(58) Field of Classification Search
　　CPC ........... H04L 1/0071; H04L 2027/0057; H04L
　　　　　　　　27/38; H04L 27/34; H04L 27/36; H04B
　　　　　　　　1/40; H04B 10/541; H04W 24/04; H03M
　　　　　　　　13/1165; H03M 13/116; H03M 13/09
　　USPC ........................................................ 375/261
　　See application file for complete search history.

(56)　　　　　　　　References Cited

U.S. PATENT DOCUMENTS

| | | | |
|---|---|---|---|
| 2014/0119473 A1* | 5/2014 | Breiling ................. | H04L 27/26 |
| | | | 375/295 |
| 2017/0019289 A1 | 1/2017 | Duan et al. | |
| 2018/0048349 A1* | 2/2018 | Sun ......................... | H04L 25/00 |
| 2018/0191423 A1 | 7/2018 | Qu et al. | |
| 2022/0045785 A1* | 2/2022 | Myung ............. | H03M 13/2778 |
| 2022/0131730 A1* | 4/2022 | Liu ................... | H04L 25/03178 |
| 2022/0182277 A1* | 6/2022 | Ma .......................... | H04L 27/36 |
| 2023/0072299 A1* | 3/2023 | Chen .................... | H04B 10/541 |
| 2024/0250697 A1* | 7/2024 | Wang ................... | H03M 13/13 |

* cited by examiner

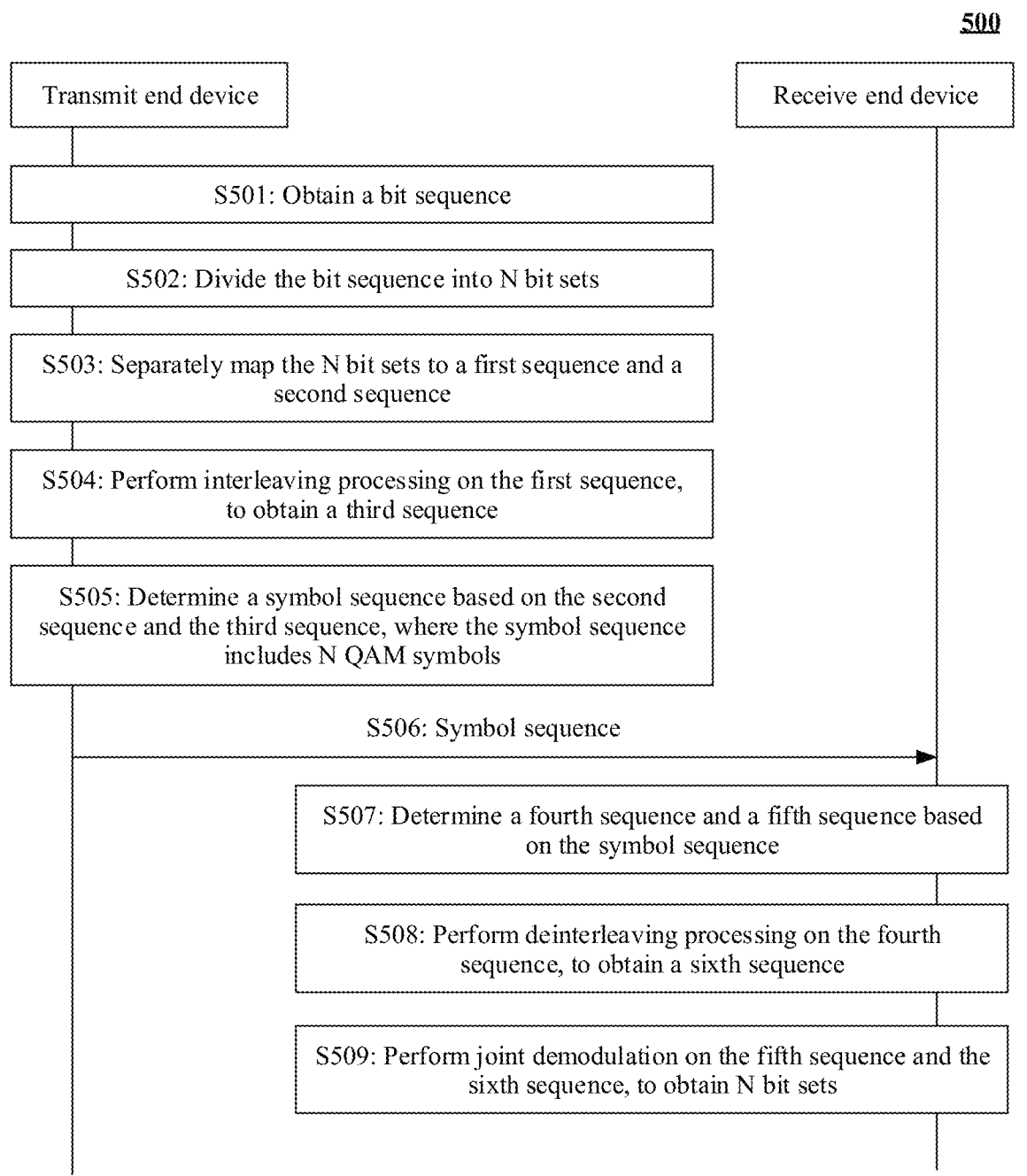

500

Transmit end device

Receive end device

S501: Obtain a bit sequence

S502: Divide the bit sequence into N bit sets

S503: Separately map the N bit sets to a first sequence and a second sequence

S504: Perform interleaving processing on the first sequence, to obtain a third sequence S505: Determine a symbol sequence based on the second sequence and the third sequence, where the symbol sequence includes N QAM symbols S506: Symbol sequence S507: Determine a fourth sequence and a fifth sequence based on the symbol sequence S508: Perform deinterleaving processing on the fourth sequence, to obtain a sixth sequence S509: Perform joint demodulation on the fifth sequence and the sixth sequence, to obtain N bit sets

FIG. 5

S503a: A transmit end device maps N bit sets to a first sequence based on a first codebook, where the first codebook indicates at least mapping relationships between the bit sets and in-phase components S503b: The transmit end device maps the N bit sets to a second sequence based on a second codebook, where the second codebook indicates at least mapping relationships between the bit sets and quadrature components

FIG. 6

S503c: A transmit end device modulates a first bit set, to obtain a modulated symbol 1

S503d: The transmit end device performs constellation rotation on the modulated symbol 1, to obtain a modulated symbol 2

FIG. 7

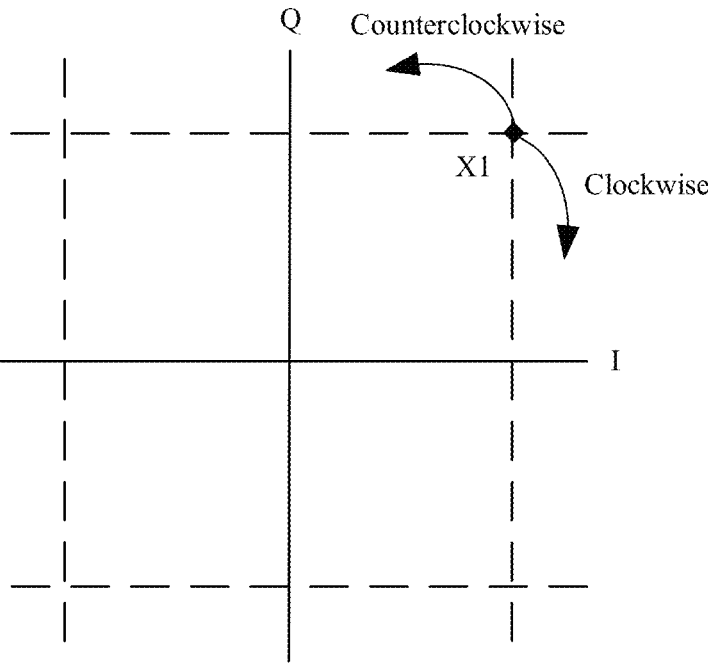

FIG. 8

COMMUNICATION METHOD AND APPARATUS

CROSS-REFERENCE TO RELATED APPLICATIONS

This application is a continuation of International Application No. PCT/CN2022/129947, filed on Nov. 4, 2022, which claims priority to Chinese Patent Application No. 202111464150.4, filed on Dec. 2, 2021. The disclosures of the aforementioned applications are hereby incorporated by reference in their entireties.

TECHNICAL FIELD

The disclosure relates to the field of wireless communication technologies, and in particular, to a communication method and apparatus.

BACKGROUND

In most communication systems, channel encoding is used to resist interference, to improve system reliability. Construction of channel encoding is based on an assumption that all information passes through an additive white Gaussian noise (AWGN) channel. The AWGN channel is a channel whose noise is evenly distributed on a spectrum and is normally distributed in amplitude.

However, most channels in a real environment are fading channels, in other words, the channels have a frequency selective fading characteristic due to impact of multipath, movement of a relative position of a receiving target/sending target, and a non-linear characteristic of a radio frequency device. Therefore, when information is transmitted on a fading channel, if channel encoding constructed based on the AWGN channel is still used, an error correction capability of the fading channel is poor, and system reliability is affected.

SUMMARY

The disclosure provides a communication method and apparatus, so that a fading channel can implement a good error correction capability. This helps improve information transmission reliability.

To achieve the foregoing objective, the following technical solutions are used in embodiments of the disclosure.

According to a first aspect, an embodiment of the disclosure provides a communication method. The method may be performed by a transmit end device, or may be performed by a chip used in a transmit end device. The following is described by using an example in which the method is performed by a transmit end device. The method includes: A transmit end device determines, based on N bit sets, a first sequence and a second sequence that are obtained through quadrature amplitude modulation QAM. The first sequence includes N in-phase components, and the second sequence includes N quadrature components, or the first sequence includes N quadrature components, and the second sequence includes N in-phase components, where N is an integer greater than or equal to 2. Then, the transmit end device performs interleaving processing on the first sequence, to obtain a third sequence. Then, the transmit end device sends, to a receive end device, a symbol sequence determined based on the second sequence and the third sequence. The symbol sequence includes N QAM symbols.

In this way, a same bit set is mapped twice, and bit information carried in the bit set is transmitted by using two sequences (for example, the second sequence and the third sequence). Because interleaving processing has been performed on the third sequence, interference to bit information at different positions is averaged, so that channel characteristics of a fading channel become even, and the fading channel is closer to an AWGN channel, to implement a good error correction capability. This helps improve information transmission reliability.

In a design, the N in-phase components are determined based on a first codebook. The first codebook indicates at least mapping relationships between the bit sets and the in-phase components. The N quadrature components are determined based on a second codebook. The second codebook indicates at least mapping relationships between the bit sets and the quadrature components.

In this way, the transmit end device maps the N bit sets to the first sequence and maps the N bit sets to the second sequence based on the preset codebooks and a bit value status in bit sets.

In a design, the N in-phase components include in-phase components of N first symbols, and the N quadrature components include quadrature components of the N first symbols. The first symbol is obtained by rotating a second symbol by a first angle on a constellation diagram, and a first modulation order of the first symbol is a square of a second modulation order of the second symbol. The second symbol is a symbol obtained by modulating the bit sets. The rotation is rotation performed clockwise or counterclockwise by using an origin of the constellation diagram as a circle center. The first angle is greater than or equal to the following angle: a minimum angle by which a symbol of the second modulation order rotates clockwise or counterclockwise on the constellation diagram when the symbol of the second modulation order encounters the $1^{st}$ symbol of the first modulation order.

In this way, the transmit end device can obtain the first sequence and the second sequence in a constellation rotation manner.

In a design, the first angle satisfies:

$$\theta = \frac{\pi}{2} \times n \pm \sin^{-1}\left(\frac{1}{\sqrt{a}}\right)$$

θ indicates the first angle, $$\sin^{-1}\left(\frac{1}{\sqrt{a}}\right)$$

indicates the minimum angle, π indicates pi, n indicates an integer greater than or equal to 0, $\sin^{-1}$ indicates an arc sine, and $\sqrt{a}$ indicates an energy normalization constant of the first symbol.

In a design, the bit sets include X bits, a modulation order of the QAM symbol is $2^{2X}$, and X is a positive integer.

According to a second aspect, an embodiment of the disclosure provides a communication method. The method may be performed by a receive end device, or may be performed by a chip used in a receive end device. The following is described by using an example in which the method is performed by a receive end device. The method includes: A receive end device receives a symbol sequence from a transmit end device, where the symbol sequence includes N quadrature amplitude modulation QAM symbols. The receive end device determines a fourth sequence and a fifth sequence based on the symbol sequence, where the fourth sequence includes in-phase components of the N QAM symbols, and the fifth sequence includes quadrature components of the N QAM symbols, or the fourth sequence includes quadrature components of the N QAM symbols, and the fifth sequence includes in-phase components of the N QAM symbols. The receive end device performs deinterleaving processing on the fourth sequence, to obtain a sixth sequence. The receive end device performs joint demodulation on the fifth sequence and the sixth sequence, to obtain N bit sets.

In a design, the bit sets include X bits, a modulation order of the QAM symbol is $2^{2X}$, and X is a positive integer.

According to a third aspect, an embodiment of the disclosure provides a communication apparatus. The communication apparatus may be the transmit end device in any one of the first aspect or the designs of the first aspect, or a chip that implements a function of the transmit end device. The communication apparatus includes a corresponding module, unit, or means for implementing the foregoing method. The module, unit, or means may be implemented by hardware, software, or implemented by hardware by executing corresponding software. The hardware or the software includes one or more modules or units corresponding to the foregoing function.

The communication apparatus includes a processing unit and a sending unit. The processing unit is configured to determine, based on N bit sets, a first sequence and a second sequence that are obtained through quadrature amplitude modulation QAM. The first sequence includes N in-phase components, and the second sequence includes N quadrature components, or the first sequence includes N quadrature components, and the second sequence includes N in-phase components, where N is an integer greater than or equal to 2. The processing unit is further configured to perform interleaving processing on the first sequence, to obtain a third sequence. The sending unit is configured to send, to a receive end device, a symbol sequence determined based on the second sequence and the third sequence. The symbol sequence includes N QAM symbols.

In a design, the N in-phase components are determined based on a first codebook. The first codebook indicates at least mapping relationships between the bit sets and the in-phase components. The N quadrature components are determined based on a second codebook. The second codebook indicates at least mapping relationships between the bit sets and the quadrature components.

In a design, the N in-phase components include in-phase components of N first symbols, and the N quadrature components include quadrature components of the N first symbols. The first symbol is obtained by rotating a second symbol by a first angle on a constellation diagram, and a first modulation order of the first symbol is a square of a second modulation order of the second symbol. The second symbol is a symbol obtained by modulating the bit sets. The rotation is rotation performed clockwise or counterclockwise by using an origin of the constellation diagram as a circle center. The first angle is greater than or equal to the following angle: a minimum angle by which a symbol of the second modulation order rotates clockwise or counterclockwise on the constellation diagram when the symbol of the second modulation order encounters the $1^{st}$ symbol of the first modulation order.

In a design, the first angle satisfies:

$$\theta = \frac{\pi}{2} \times n \pm \sin^{-1}\left(\frac{1}{\sqrt{a}}\right)$$

θ indicates the first angle, $$\sin^{-1}\left(\frac{1}{\sqrt{a}}\right)$$

indicates the minimum angle, π indicates pi, n indicates an integer greater than or equal to 0, $\sin^{-1}$ indicates an arc sine, and √a indicates an energy normalization constant of the first symbol.

In a design, the bit sets include X bits, a modulation order of the QAM symbol is $2^{2X}$, and X is a positive integer.

According to a fourth aspect, an embodiment of the disclosure provides a communication apparatus. The communication apparatus may be the receive end device in any one of the second aspect or the designs of the second aspect, or a chip that implements a function of the receive end device. The communication apparatus includes a corresponding module, unit, or means for implementing the foregoing method. The module, unit, or means may be implemented by hardware, software, or implemented by hardware by executing corresponding software. The hardware or the software includes one or more modules or units corresponding to the foregoing function.

The communication apparatus includes a receiving unit and a processing unit. The receiving unit is configured to receive a symbol sequence from a transmit end device, where the symbol sequence includes N quadrature amplitude modulation QAM symbols. The processing unit is configured to determine a fourth sequence and a fifth sequence based on the symbol sequence, where the fourth sequence includes in-phase components of the N QAM symbols, and the fifth sequence includes quadrature components of the N QAM symbols, or the fourth sequence includes quadrature components of the N QAM symbols, and the fifth sequence includes in-phase components of the N QAM symbols. The processing unit is further configured to perform deinterleaving processing on the fourth sequence, to obtain a sixth sequence. The processing unit is further configured to perform joint demodulation on the fifth sequence and the sixth sequence, to obtain N bit sets.

In a design, the bit sets include X bits, a modulation order of the QAM symbol is $2^{2X}$, and X is a positive integer.

According to a fifth aspect, an embodiment of the disclosure provides a communication apparatus, including a processor and a memory. The memory is configured to store computer instructions. When the processor executes the instructions, the communication apparatus is enabled to perform the method implemented by the transmit end device in any one of the foregoing aspects or the designs of the foregoing aspects. The communication apparatus may be the transmit end device in any one of the first aspect or the designs of the first aspect, or a chip that implements a function of the transmit end device.

According to a sixth aspect, an embodiment of the disclosure provides a communication apparatus, including a processor. The processor is coupled to a memory, and is configured to read and execute instructions in the memory, to enable the communication apparatus to perform the method performed by the transmit end device in any one of the foregoing aspects or the designs of the foregoing aspects. The communication apparatus may be the transmit end device in any one of the first aspect or the designs of the first aspect, or a chip that implements a function of the transmit end device.

According to a seventh aspect, an embodiment of the disclosure provides a chip, including a processing circuit and an input/output interface. The input/output interface is configured to communicate with a module outside the chip. For example, the chip may be a chip that implements a function of the transmit end device in any one of the first aspect or the designs of the first aspect. The processing circuit is configured to run a computer program or instructions, to implement the method in any one of the first aspect or the designs of the first aspect.

According to an eighth aspect, an embodiment of the disclosure provides a communication apparatus, including a processor and a memory. The memory is configured to store computer instructions. When the processor executes the instructions, the communication apparatus is enabled to perform the method implemented by the receive end device in any one of the foregoing aspects or the designs of the foregoing aspects. The communication apparatus may be the receive end device in any one of the second aspect or the designs of the second aspect, or a chip that implements a function of the receive end device.

According to a ninth aspect, an embodiment of the disclosure provides a communication apparatus, including a processor. The processor is coupled to a memory, and is configured to read and execute instructions in the memory, to enable the communication apparatus to perform the method performed by the receive end device in any one of the foregoing aspects or the designs of the foregoing aspects. The communication apparatus may be the receive end device in any one of the second aspect or the designs of the second aspect, or a chip that implements a function of the receive end device.

According to a tenth aspect, an embodiment of the disclosure provides a chip, including a processing circuit and an input/output interface. The input/output interface is configured to communicate with a module outside the chip. For example, the chip may be a chip that implements a function of the receive end device in any one of the second aspect or the designs of the second aspect. The processing circuit is configured to run a computer program or instructions, to implement the method in any one of the second aspect or the designs of the second aspect.

According to an eleventh aspect, an embodiment of the disclosure provides a computer-readable storage medium. The computer-readable storage medium stores instructions. When the instructions are run on a computer, the computer is enabled to perform the method in any one of the foregoing aspects.

According to a twelfth aspect, an embodiment of the disclosure provides a computer program product including instructions. When the computer program product runs on a computer, the computer is enabled to perform the method in any one of the foregoing aspects.

According to a thirteenth aspect, an embodiment of the disclosure provides a circuit system. The circuit system includes a processing circuit. The processing circuit is configured to perform the method in any one of the foregoing aspects.

According to a fourteenth aspect, an embodiment of the disclosure provides a communication system. The communication system includes the transmit end device and the receive end device in any one of the foregoing aspects.

For technical effects brought by any design of the second aspect to the fourteenth aspect, refer to beneficial effects in the corresponding method provided above. Details are not described herein again.

BRIEF DESCRIPTION OF DRAWINGS

FIG. 5 is a flowchart of a communication method according to an embodiment of the disclosure;
FIG. 6 is a flowchart of another communication method according to an embodiment of the disclosure;
FIG. 7 is a flowchart of still another communication method according to an embodiment of the disclosure;
FIG. 8 is a diagram of a constellation rotation scenario according to an embodiment of the disclosure.

DESCRIPTION OF EMBODIMENTS

The following describes technical solutions of the disclosure with reference to accompanying drawings.

Figure 1:
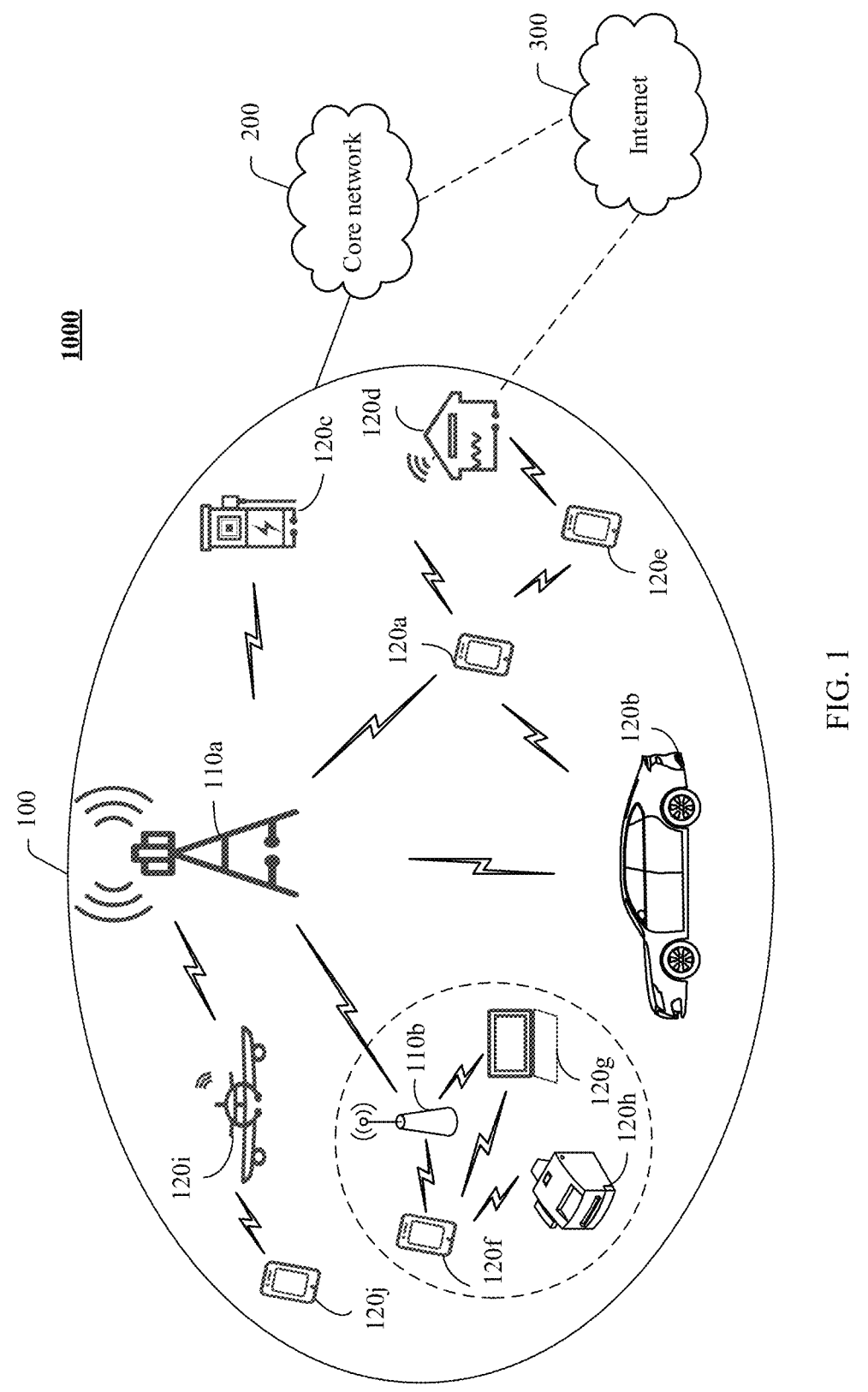
FIG. 1 is a diagram of an architecture of a communication system according to an embodiment of the disclosure.

FIG. 1 is a diagram of an architecture of a communication system 1000 to which an embodiment of the disclosure is applied. As shown in FIG. 1, the communication system includes a radio access network 100 and a core network 200. Optionally, the communication system 1000 may further include an internet 300. The radio access network 100 may include at least one radio access network device (for example, 110a and 110b in FIG. 1), and may further include at least one terminal device (for example, 120a to 120j in FIG. 1). The terminal device is connected to the radio access network device in a wireless manner, and the radio access network device is connected to the core network in a wireless or wired manner. A core network device and the radio access network device may be different independent physical devices, or functions of the core network device and logical functions of the radio access network device may be integrated into one physical device, or some functions of the core network device and some functions of the radio access network device may be integrated into one physical device. Terminal devices may be connected to each other in a wired or wireless manner, and radio access network devices may be connected to each other in a wired or wireless manner. FIG. 1 is only a diagram. The communication system may further include other network devices, for example, may further include a wireless relay device and a wireless backhaul device, which are not shown in FIG. 1.

The radio access network device may be a base station (BS), an evolved NodeB (eNodeB), a transmission reception point (TRP), a next generation NodeB (gNB) in a $5^{th}$ generation (5G) mobile communication system, a next generation NodeB in a $6^{th}$ generation (6G) mobile communication system, a base station in a future mobile communication system, an access node in a Wi-Fi system, or the like, or may be a module or unit that implements some functions of the base station, for example, may be a central unit (CU), or may be a distributed unit (DU). The CU herein implements functions of a radio resource control protocol and a packet data convergence protocol (PDCP) of the base station, and may further implement a function of a service data adaptation protocol (SDAP). The DU implements functions of a radio link control layer and a medium access control (MAC) layer of the base station, and may further implement some or all functions of a physical layer. For descriptions of the foregoing protocol layers, refer to technical specifications related to the 3rd generation partnership project (3GPP). The radio access network device may be a macro base station (for example, 110*a* in FIG. 1), or may be a micro base station or an indoor base station (for example, 110*b* in FIG. 1), or may be a relay node or a donor node. A technology and a device form that are used by the radio access network device are not limited in the embodiment of the disclosure. For ease of description, the following uses an example in which a base station is used as a radio access network device for description.

The terminal device may also be referred to as a terminal, user equipment (UE), a mobile station, a mobile terminal, or the like. The terminal device may be widely used in various scenarios, for example, device-to-device (D2D), vehicle-to-everything (V2X) communication, machine-type communication (MTC), internet of things (IoT), virtual reality, augmented reality, industrial control, self-driving, telemedicine, a smart grid, smart furniture, smart office, smart wear, smart transportation, and a smart city. The terminal device may be a mobile phone, a tablet computer, a computer having a wireless transceiver function, a wearable device, a vehicle, an uncrewed aerial vehicle, a helicopter, an airplane, a ship, a robot, a robot arm, a smart home device, or the like. A technology and a device form used by the terminal device are not limited in the embodiment of the disclosure.

The base station and the terminal device may be located at a fixed position, or may be mobile. The base station and the terminal device may be deployed on land, including an indoor or outdoor device, a handheld device, or a vehicle-mounted device, may be deployed on water, or may be deployed on an airplane, a balloon, or a satellite in air. Disclosure scenarios of the base station and the terminal device are not limited in the embodiment of the disclosure.

Roles of the base station and the terminal device may be relative. For example, a helicopter or an unmanned aerial vehicle 120*i* in FIG. 1 may be configured as a mobile base station. For a terminal device 120*j* that accesses the radio access network 100 by using the 120*i*, the terminal device 120*i* is a base station. However, for the base station 110*a*, the 120*i* is a terminal device, that is, the 110*a* and the 120*i* communicate with each other by using a wireless air interface protocol. Certainly, the 110*a* and the 120*i* may alternatively communicate with each other by using an interface protocol between base stations. In this case, for the 110*a*, the 120*i* is also a base station. Therefore, both the base station and the terminal device may be collectively referred to as communication apparatuses. The 110*a* and the 110*b* in FIG. 1 may be referred to as communication apparatuses having a function of the base station, and the 120*a* to 120*j* in FIG. 1 may be referred to as communication apparatuses having a function of the terminal device.

A base station and a terminal device, a base station and a base station, and a terminal device and a terminal device may communicate with each other by using a licensed spectrum, or may communicate with each other by using an unlicensed spectrum, or may communicate with each other by simultaneously using a licensed spectrum and an unlicensed spectrum. Communication may be performed by using a spectrum below 6 gigahertz (GHz), or may be performed by using a spectrum above 6 GHz, or may be performed by simultaneously using a spectrum below 6 GHz and a spectrum above 6 GHz. A spectrum resource used in wireless communication is not limited in the embodiment of the disclosure.

In embodiments of the disclosure, the function of the base station may alternatively be performed by a module (for example, a chip) in the base station, or may be performed by a control subsystem including the function of the base station. The control subsystem including the function of the base station may be a control center in the foregoing disclosure scenarios such as a smart grid, industrial control, smart transportation, and a smart city. The function of the terminal device may alternatively be performed by a module (for example, a chip or a modem) in the terminal device, or may be performed by an apparatus including the function of the terminal device.

In the disclosure, the base station sends a downlink signal or downlink information to the terminal device, where the downlink information is carried in a downlink channel. The terminal device sends an uplink signal or uplink information to the base station, where the uplink information is carried in an uplink channel. To communicate with the base station, the terminal device needs to establish a wireless connection to a cell controlled by the base station. The cell that establishes the wireless connection to the terminal device is referred to as a serving cell of the terminal device. When communicating with the serving cell, the terminal device is further interfered with a signal from a neighboring cell.

Figure 2:
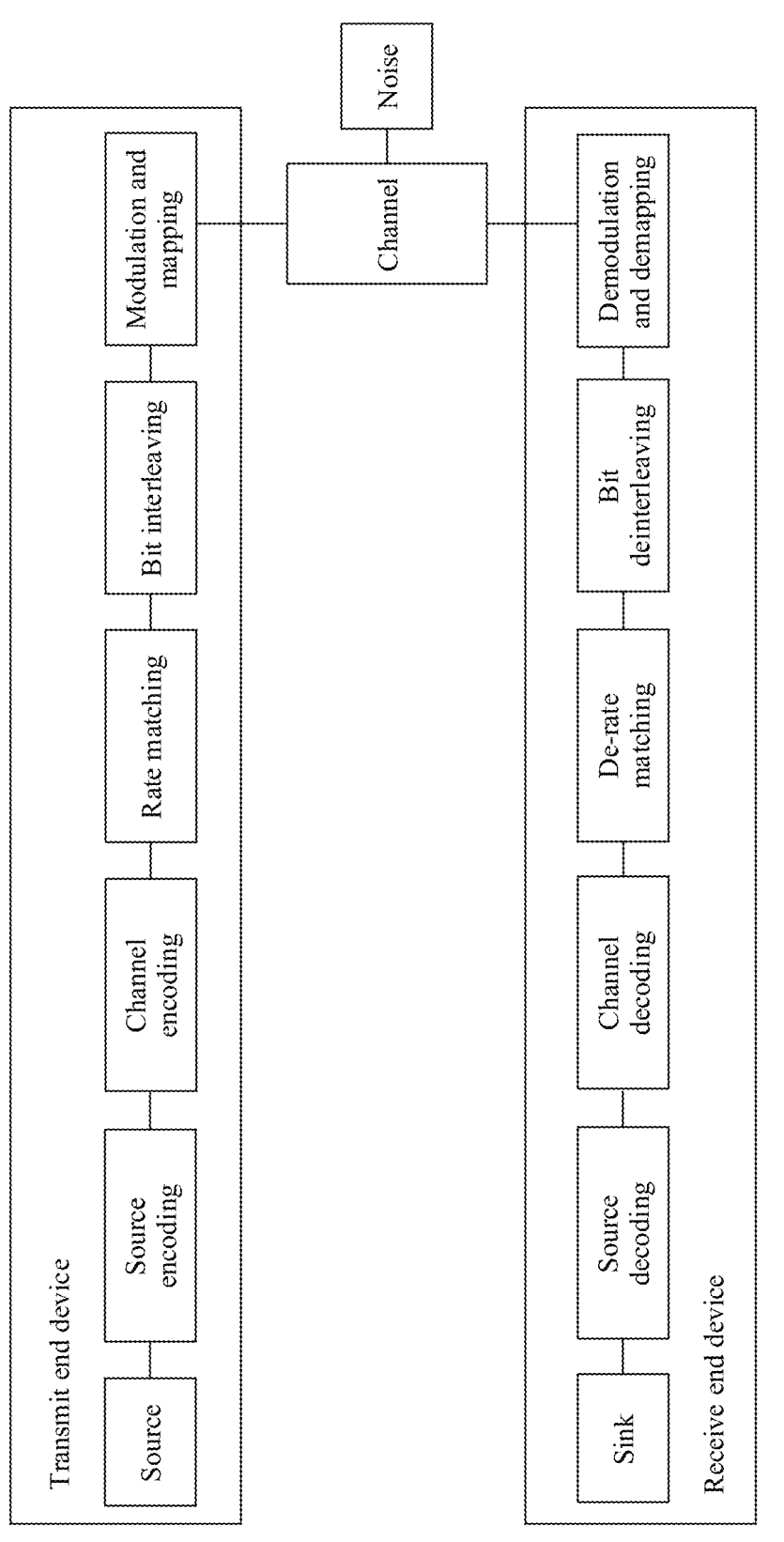
FIG. 2 is a basic flowchart of wireless communication according to an embodiment of the disclosure.

FIG. 2 is a basic flowchart of performing communication according to a wireless technology. As shown in FIG. 2, a transmit end device performs source encoding, channel encoding, rate matching, bit interleaving, and modulation and mapping on a source, to obtain a to-be-transmitted signal; and sends the signal to a receive end device. When the signal is transmitted on a channel between the transmit end device and the receive end device, the signal may be interfered with noise. After receiving the signal, the receive end device performs demodulation and demapping, bit deinterleaving, de-rate matching, channel decoding, and source decoding on the signal, to obtain a destination (namely, a restored source).

It should be understood that FIG. 2 shows only some steps in sending and receiving processes. During actual implementation, there may be other steps. This is not limited in embodiments of the disclosure.

For ease of understanding of embodiments of the disclosure, the following briefly describes technologies related to the disclosure.

1. AWGN Channel and Fading Channel

The AWGN channel is a channel whose noise is evenly distributed on a spectrum and is normally distributed in amplitude. The AWGN channel is mainly used for simulation of a communication system.

Figure 3:
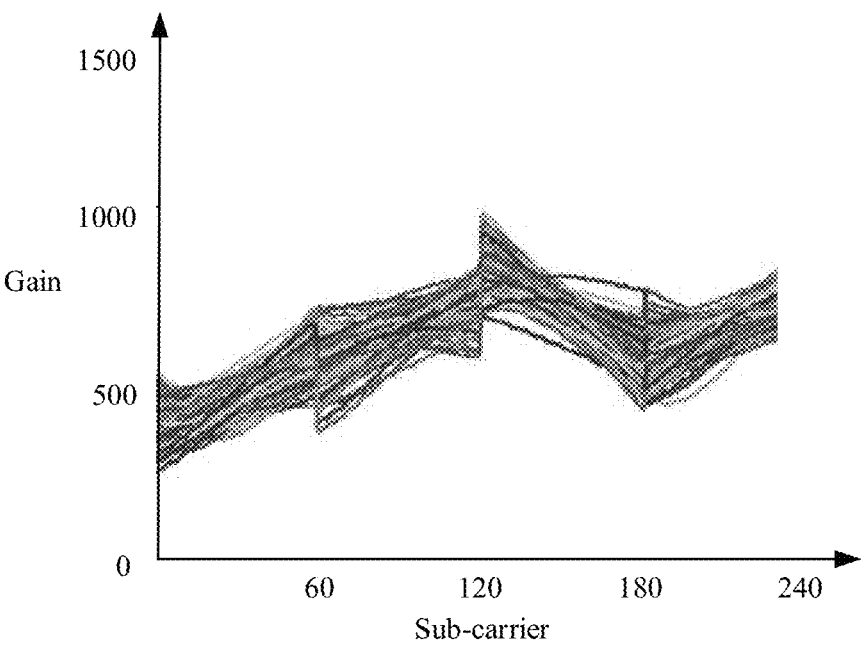
FIG. 3 is a performance result diagram of a fading channel according to an embodiment of the disclosure.

The fading channel is a channel that has a frequency selective fading characteristic due to impact of multipath, movement of a relative position of a receiving target/sending target, and a non-linear characteristic of a radio frequency device. Most channels in a real environment are fading channels, which are more complex than AWGN channels. For example, FIG. 3 shows a performance result of a fading channel. When a signal is transmitted on a fading channel, gains of the signal transmitted by using different sub-carriers are different, as shown by a broken line in FIG. 3.

2. Modulation and Mapping

Modulation and mapping are that a transmit end device maps bits in a bit sequence (for example, bits obtained through bit interleaving in FIG. 2) to constellation points in a constellation diagram. One constellation point corresponds to one or more bits, and one bit in the bit sequence may be mapped to one bit in the constellation point. One constellation point corresponds to one modulated symbol.

An objective of modulation and mapping is to process, in time domain, frequency domain, or coding domain, a bit sequence that needs to be transmitted, to transmit as much information as possible by using as small bandwidth as possible.

For example, the transmit end device divides the bit sequence, where every n bits form a bit set, and maps each bit set to a modulated symbol. When a modulation scheme is binary phase shift keying (BPSK), n=1, and a modulation order is 2. When the modulation scheme is quadrature phase shift keying (QPSK), n=2, and the modulation order is 4. QPSK may also be understood as QAM 4. When the modulation scheme is quadrature amplitude modulation (QAM) 16, n=4, and the modulation order is 16. When the modulation scheme is QAM 64, n=6, and the modulation order is 64. When the modulation scheme is QAM 256, n=8, and the modulation order is 256. The modulation order of QAM may also be another value. Details are not described herein.

One modulated symbol is determined based on an in-phase (I) component and a quadrature (Q) component. For example, a codebook of QAM 16 is shown in Table 1.

TABLE 1

| Bit set | | | | Modulated symbol | |
|---|---|---|---|---|---|
| $b_0$ | $b_1$ | $b_2$ | $b_3$ | I | Q |
| 0 | 0 | 0 | 0 | 3 | 3 |
| 0 | 1 | 0 | 0 | 1 | 3 |
| 1 | 1 | 0 | 0 | −1 | 3 |
| 1 | 0 | 0 | 0 | −3 | 3 |
| 0 | 0 | 0 | 1 | 3 | 1 |
| 0 | 1 | 0 | 1 | 1 | 1 |
| 1 | 1 | 0 | 1 | −1 | 1 |
| 1 | 0 | 0 | 1 | −3 | 1 |
| 0 | 0 | 1 | 0 | 3 | −3 |
| 0 | 1 | 1 | 0 | 1 | −3 |
| 1 | 1 | 1 | 0 | −1 | −3 |
| 1 | 0 | 1 | 0 | −3 | −3 |
| 0 | 0 | 1 | 1 | 3 | −1 |
| 0 | 1 | 1 | 1 | 1 | −1 |
| 1 | 1 | 1 | 1 | −1 | −1 |
| 1 | 0 | 1 | 1 | −3 | −1 |

Figure 4:
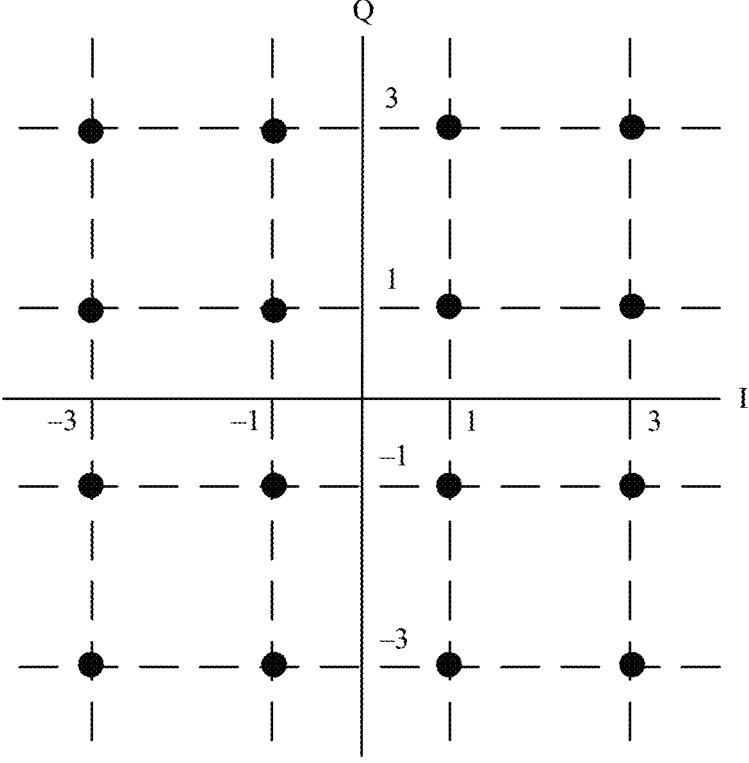
FIG. 4 is a constellation diagram according to an embodiment of the disclosure.

In Table 1, the first two bits in a bit set are used to determine an in-phase component, that is, $b_0$ and $b_1$ are used to determine a value of I, as shown by numbers in bold. The last two bits in a bit set are used to determine a quadrature component, that is, $b_2$ and $b_3$ are used to determine a value of Q, as shown by normally displayed numbers. For example, the $1^{st}$ row is used as an example, and 0000 is used as a bit set. It is determined, based on the first two bits 0 and 0 in the bit set, that a value of I is 3. It is determined, based on the last two bits 0 and 0 in the bit set, that a value of Q is 3. In other words, after 0000 is adjusted, both the in-phase component and the quadrature component of the obtained modulated symbol are 3, as shown by a black point on an upper right side in FIG. 4. For a mapping status of another row, refer to Table 1. Details are not described herein again. A constellation diagram of QAM 16 is shown in FIG. 4.

An inverse process of modulation and mapping is demodulation and demapping, namely, a process of restoring a bit sequence from a constellation point.

3. Log-Likelihood Ratio (LLR)

A log-likelihood ratio of a bit is a natural logarithm of a ratio of a probability that the bit is 0 to a probability that the bit is 1. If the probability that the bit is 1 is denoted as p(1), and the probability that the bit is 0 is denoted as p(0), the log-likelihood ratio of the bit is ln[p(0)/p(1)].

For example, on a receive end device side, a received signal satisfies:

$$Y = HX + \sigma^2 \qquad \text{Formula (1)}$$

Y indicates a received modulated symbol, X indicates a sent modulated symbol, H indicates a channel response, and $\sigma^2$ indicates a noise variance on a channel.

The channel response and the noise variance may be estimated by using a channel estimation technology. Therefore, a maximum probability of the sent modulated symbol is estimated by using the received modulated symbol Y, the channel response H, and the noise variance $\sigma^2$, that is, a likelihood probability satisfies:

$$P(\hat{X} = X_i) = \frac{1}{\Delta} \times e^{\frac{|Y - HX_i|^2}{\sigma^2}} \qquad \text{Formula (2)}$$

$\Delta$ indicates a normalized value, e indicates a mathematical constant, Y indicates a received modulated symbol, H indicates a channel response, $X_i$ indicates an $i^{th}$ modulated symbol in all possible modulated symbols under the modulation, $\sigma^2$ indicates a noise variance on a channel, $\hat{X}$ indicates a received modulated symbol, and $P(\hat{X}=X_i)$ indicates a probability that the received modulated symbol $\hat{X}$ is $X_i$.

With reference to Formula (1) and Formula (2), LLR satisfies:

$$LLR = \ln \frac{\sum_{X_i \in X_j^0} P(\hat{X} = X_i)}{\sum_{X_i \in X_j^1} P(\hat{X} = X_i)} \qquad \text{Formula (3)}$$

LLR indicates a log-likelihood ratio, $X_i$ indicates an $i^{th}$ modulated symbol in all possible modulated symbols under the modulation, $$X_j^0$$

indicates a set of all modulated symbols, in all the possible modulated symbols, whose $j^{th}$ bit is 0 under the modulation, $$X_j^1$$

indicates a set of all modulated symbols, in all the possible modulated symbols, whose $j^{th}$ bit is 1 under the modulation, indicates a received modulated symbol, and $P(\hat{X}=X_i)$ indicates a probability that the received $\hat{X}$ modulated symbol is $X_i$. For details, refer to Formula (2). i and j are positive integers.

$$X_i \epsilon X_j^0 i$$

is described as follows.

QAM 16 is used as an example. When j=0, that is, a value of $b_0$ is 0, values of $b_1$, $b_2$, and $b_3$ may be 0 or may be 1. With reference to Table 1, $$X_j^0 = \{\{3, 3\}, \{1, 3\}, \{3, 1\}, \{1, 1\}, \{3, -3\}, \{1, -3\}, \{3, -1\}, \{1, -1\}\}. \{3, 3\}$$

indicates a modulated symbol whose in-phase component and quadrature component are both 3. Other modulated symbols of $$X_j^0$$

may be deduced by analogy. Details are not described again.

$$X_i \epsilon X_j^0$$

indicates an $i^{th}$ modulated symbol $$X_i \text{ in } X_j^0.$$

When j=0, and i=1, $X_i$ may indicate {3, 3 }. A case in which i and j are other values may be deduced by analogy. Details are not described again.

Similarly, $$X_i \epsilon X_j^1$$

is described as follows.

QAM 16 is used as an example. When j=0, that is, a value of $b_0$ is 1, values of $b_1$, $b_2$, and $b_3$ may be 0 or may be 1. With reference to Table 1, $$X_j^1 = \{\{-1, 3\}, \{-3, 3\}, \{-1, 1\},$$
$$\{-3, 1\}, \{-1, -3\}, \{-3, -3\}, \{-1, -1\}, \{-3, -1\}\}.$$

$$X_i \epsilon X_j^1$$

indicates an $i^{th}$ modulated symbol $$X_i \text{ in } X_j^0.$$

When j=0, and i=1, $X_i$ may indicate {−1, 3}. A case in which i and j are other values may be deduced by analogy. Details are not described again.

Formula (3) is simplified in a log-max manner, that is:

$$LLR = \frac{1}{\sigma^2}\left(\max_{X_i \epsilon X_j^0}\left(|Y - HX_i|^2\right) - \max_{X_i \epsilon X_j^1}\left(|Y - HX_i|^2\right)\right) \quad \text{Formula (4)}$$

$\sigma^2$ indicates a noise variance on a channel, max indicates a maximum value, $X_i$ indicates an $i^{th}$ modulated symbol in all possible modulated symbols under the modulation, $$X_j^0$$

indicates a set of all modulated symbols, in all the possible modulated symbols, whose $j^{th}$ bit is 0 under the modulation, $$X_j^1$$

indicates a set of all modulated symbols, in all the possible modulated symbols, whose $j^{th}$ bit is 1 under the modulation, Y indicates a received modulated symbol, and H indicates a channel response, where i and j are positive integers.

4. Channel Encoding

Channel encoding, also referred to as error control encoding, means that redundant bits are added to information bits (for example, bits obtained through source encoding in FIG. 2) at a transmit end device. These redundant bits are associated with the information bits. Bits obtained through channel encoding sequentially include the information bits and the redundant bits.

A reverse process of channel encoding is channel decoding. Channel decoding means that a receive end device detects and corrects, based on correlations between the redundant bits and the information bits, an error generated in a transmission process, to restore the information bits. This resists interference in the transmission process and improves data transmission reliability.

Construction of channel encoding is based on an assumption that all information passes through an AWGN channel. However, most channels in a real environment are fading channels and have a frequency selective fading characteristic. Therefore, if channel encoding constructed based on the AWGN channel is still used, an error correction capability of the fading channel is poor, and system reliability is affected.

In view of this, an embodiment of the disclosure provides a communication method, applied to the communication system in FIG. 1. In the communication method provided in the embodiment of the disclosure, a transmit end device separately maps N bit sets to a first sequence and a second sequence that are obtained through QAM. The first sequence includes N in-phase components, and the second sequence includes N quadrature components, or the first sequence includes N quadrature components, and the second sequence includes N in-phase components, where N is an integer greater than or equal to 2. Then, the transmit end device performs interleaving processing on the first sequence, to obtain a third sequence. Then, the transmit end device sends, to a receive end device, a symbol sequence determined based on the second sequence and the third sequence. The symbol sequence includes N QAM symbols. In this way, a same bit set is mapped twice, and bit information carried in the bit set is transmitted by using two sequences (for example, the second sequence and the third sequence). Because interleaving processing has been performed on the third sequence, interference to bit information at different positions is averaged, so that channel characteristics of a fading channel become even, and the fading channel is closer to an AWGN channel, to implement a good error correction capability. This helps improve information transmission reliability.

With reference to FIG. 5, the following describes in detail a communication method 500 provided in an embodiment of the disclosure. The communication method 500 includes the following steps.

S501: A transmit end device obtains a bit sequence.

The transmit end device is a device that is to send information. The transmit end device may also be described as a transmit end apparatus, a transmitting end device, a transmitting end apparatus, or the like. A name of the transmit end device is not limited in the embodiment of the disclosure, and only the transmit end device is used as an example for description. For example, FIG. 1 is used as an example. During uplink transmission, the transmit end device may be a terminal device. During downlink transmission, the transmit end device may be an access network device.

The bit sequence is a sequence including a plurality of bits, for example, a sequence including 1000 bits, which may be denoted as $b_0$, $b_1$, $b_2$, $b_3$, . . . , $b_{996}$, $b_{997}$, $b_{998}$, and $b_{999}$. $b_0$ indicates the $1^{st}$ bit in the bit sequence, $b_1$ indicates the $2^{nd}$ bit in the bit sequence, and other bits may be denoted by analogy. Details are not described again. For example, FIG. 2 is used as an example. The bit sequence is a sequence including bits that are obtained by performing source encoding, channel encoding, rate matching, and bit interleaving on a source, and modulation and mapping are to be performed.

S502: The transmit end device divides the bit sequence into N bit sets.

Each of the N bit sets includes one or more bits. N is an integer greater than or equal to 2. A quantity of bits in each bit set is determined based on a modulation order of a QAM symbol transmitted between the transmit end device and a receive end device. Each bit set includes X bits, and the modulation order of the QAM symbol transmitted between the transmit end device and the receive end device is $2^{2X}$. For the QAM symbol, refer to the descriptions of S505. Details are not described herein again.

For example, a modulation order used for physical downlink shared channel (PDSCH) transmission is used as an example. A quantity of bits in each bit set may be determined based on downlink control information (DCI). For example, a modulation order, used for PDSCH transmission, corresponding to DCI scrambled by a paging-radio network temporary identifier (P-RNTI), a random access-radio network temporary identifier (RA-RNTI), or a system information-radio network temporary identifier (SI-RNTI) is 2. In addition to the DCI scrambled by the RNTI, the modulation order used for the PDSCH transmission is obtained by querying a table, as shown in Table 7.1.7.1-1 in 3GPP TS 36.213. When the modulation order of the QAM symbol transmitted between the transmit end device and the receive end device is determined, a transmit end device may determine the quantity of bits in each bit set.

For example, QPSK modulation is used as an example. A modulation order is $4=2^{2 \times 1}$, and each bit set includes one bit. The sequence including 1000 bits is still used as an example. A value of N is 1000. In other words, the bit sequence is divided into 1000 bit sets, which may be denoted as $A_0$, $A_1$, $A_2$, $A_3$, . . . , $A_{996}$, $A_{997}$, $A_{998}$, and $A_{999}$. $A_0$ indicates the $1^{st}$ bit set in the 1000 bit sets, $A_1$ indicates the $2^{nd}$ bit set in the 1000 bit sets, and other bit sets may be denoted by analogy. Details are not described again.

For another example, QAM 16 is used as an example. A modulation order is $16=2^{2 \times 2}$, and each bit set includes two bits. The sequence including 1000 bits is still used as an example. A value of N is 500. In other words, the bit sequence is divided into 500 bit sets, which may be denoted as $A_0$, $A_1$, $A_2$, $A_3$, . . . , $A_{496}$, $A_{497}$, $A_{498}$, and $A_{499}$. For a notation of the bit set, refer to the descriptions in a previous paragraph. Details are not described again.

For another example, QAM 256 is used as an example. A modulation order is $256=2^{2 \times 4}$ and each bit set includes four bits. The sequence including 1000 bits is still used as an example. A value of N is 250. In other words, the bit sequence is divided into 250 bit sets, which may be denoted as $A_0$, $A_1$, $A_2$, $A_3$, . . . , $A_{296}$, $A_{297}$, $A_{298}$, and $A_{249}$. For a notation of the bit set, refer to the descriptions in a previous paragraph. Details are not described again.

It should be understood that there may be another quantity of modulation orders. Correspondingly, the quantity of bits in the bit set also changes. A division status of the bit set is not described one by one.

S503: The transmit end device separately maps the N bit sets to a first sequence and a second sequence.

For the N bit sets, refer to the descriptions of S502. Details are not described herein again.

The first sequence and the second sequence each include one type of component in quadrature amplitude modulation. For example, the first sequence includes N in-phase components, and the second sequence includes N quadrature components. Alternatively, the first sequence includes N quadrature components, and the second sequence includes N in-phase components. The N in-phase components are in a one-to-one correspondence with the N bit sets, and the N quadrature components are also in a one-to-one correspondence with the N bit sets. For example, a $k^{th}$ bit set in the N bit sets corresponds to a $k^{th}$ in-phase component in the N in-phase components. The $k^{th}$ bit set in the N bit sets also corresponds to a $k^{th}$ quadrature component in the N quadrature components. k is a positive integer, and k is less than or equal to N.

A modulation order of quadrature amplitude modulation is $2^{2X}$. X indicates the quantity of bits in the bit set. For example, if each bit set includes two bits, the modulation order of quadrature amplitude modulation is 16. For another example, if each bit set includes four bits, the modulation order of quadrature amplitude modulation is 256. A case of another bit set may be deduced by analogy. Details are not described again.

For example, an example in which the first sequence includes N in-phase components, and the second sequence includes N quadrature components is used to describe an implementation process of S503. S503 is implemented in the following two manners.

Implementation 1: As shown in FIG. 6, S503 includes S503a and S503b.

S503a: The transmit end device maps the N bit sets to the first sequence based on a first codebook.

The first codebook indicates at least mapping relationships between the bit sets and the in-phase components. For example, an example in which each bit set includes two bits, and in-phase components are in QAM 16 is used to describe the first codebook, as shown in Table 2.

TABLE 2

| Bit set | | In-phase component |
|---|---|---|
| $b_0$ | $b_1$ | I |
| 0 | 0 | 3 |
| 0 | 1 | 1 |
| 1 | 1 | −3 |
| 1 | 0 | −1 |

In Table 2, each bit set includes two bits, which are respectively denoted as $b_0$ and $b_1$. $b_0$ and $b_1$ are used to determine a value of an in-phase component in QAM 16. For example, the $1^{st}$ row is used as an example. It is determined based on bits 0 and 0 in the bit set that the value of the in-phase component is 3. For another example, the $2^{nd}$ row is used as an example. It is determined based on bits 0 and 1 in the bit set that the value of the in-phase component is 1. For a mapping status of another row, refer to Table 2. Details are not described herein again.

It should be understood that the first codebook is described by using only an example in which each bit set includes two bits. Certainly, the quantity X of bits in each bit set may also have another value, and the in-phase component indicated by the first codebook also changes. Details are not described herein again.

S503b: The transmit end device maps the N bit sets to the second sequence based on a second codebook.

The second codebook indicates at least mapping relationships between the bit sets and the quadrature components. For example, an example in which each bit set includes two bits, and quadrature components are in QAM 16 is used to describe the second codebook, as shown in Table 3.

TABLE 3

| Bit set | | Quadrature component |
|---|---|---|
| $b_0$ | $b_1$ | Q |
| 0 | 0 | −1 |
| 0 | 1 | 3 |
| 1 | 1 | 1 |
| 1 | 0 | −3 |

In Table 3, each bit set includes two bits, which are respectively denoted as $b_0$ and $b_1$. $b_0$ and $b_1$ are used to determine a value of a quadrature component in QAM 16. For example, the $1^{st}$ row is used as an example. It is determined based on bits 0 and 0 in the bit set that the value of the quadrature component is −1. For another example, the $2^{nd}$ row is used as an example. It is determined based on bits 0 and 1 in the bit set that the value of the quadrature component is 3. For a mapping status of another row, refer to Table 3. Details are not described herein again.

It should be understood that the second codebook is described by using only an example in which each bit set includes two bits. Certainly, the quantity X of bits in each bit set may also have another value, and the quadrature component indicated by the second codebook also changes. Details are not described herein again.

In this way, the transmit end device maps the N bit sets to the first sequence and maps the N bit sets to the second sequence based on the preset codebooks and a bit value status in bit sets.

It should be noted that when S503 is implemented as S503a and S503b, the transmit end device may first perform S503a and then perform S503b, or may first perform S503b and then perform S503a, or may simultaneously perform S503a and S503b. This is not limited in the embodiment of the disclosure. In the foregoing implementation 1, only an example in which the first sequence includes N in-phase components, and the second sequence includes N quadrature components is used for description. Certainly, when the first sequence includes the N quadrature component, and the second sequence includes the N in-phase components, the transmit end device may map the N bit sets to the second sequence based on the first codebook, and map the N bit sets to the first sequence based on the second codebook. For an implementation process, refer to S503a and S503b. Details are not described herein again.

Implementation 2: A bit set in the N bit sets is denoted as a first bit set. The first bit set is used as an example to describe a processing process of the bit set. As shown in FIG. 7, S503 includes S503c and S503d.

S503c: The transmit end device modulates the first bit set, to obtain a modulated symbol 1.

A modulation order of the modulated symbol 1 is equal to $2^X$. X indicates a quantity of bits in each of the N bit sets.

For example, the first bit set includes two bits, the modulated symbol 1 is a modulated symbol obtained through QPSK modulation, and the modulation order of the modulated symbol 1 is 4.

For another example, the first bit set includes four bits, the modulated symbol 1 is a modulated symbol obtained through QAM 16, and the modulation order of the modulated symbol 1 is 16.

For another example, the first bit set includes eight bits, the modulated symbol 1 is a modulated symbol obtained through QAM 256, and the modulation order of the modulated symbol 1 is 256.

It should be understood that the quantity of bits in the first bit set may also have another value, and correspondingly, the modulation order of the modulated symbol 1 also changes. Details are not described herein again.

S503d: The transmit end device performs constellation rotation on the modulated symbol 1, to obtain a modulated symbol 2.

A modulation order of the modulated symbol 2 is a square of the modulation order of the modulated symbol 1. For example, if the modulation order of the modulated symbol 1 is 2, the modulation order of the modulated symbol 2 is 4. For another example, if the modulation order of the modulated symbol 1 is 4, the modulation order of the modulated symbol 2 is 16. For another example, if the modulation order of the modulated symbol 1 is 16, the modulation order of the modulated symbol 2 is 256.

The constellation rotation is to rotate clockwise or counterclockwise, by using an origin of a constellation diagram on which the modulated symbol 1 is located as a circle center and on a plane on which the constellation diagram is located, a constellation point corresponding to the modulated symbol 1. For example, as shown in FIG. 8, an example in which the modulated symbol 1 is a symbol obtained through QPSK modulation is used. The constellation point corresponding to the modulated symbol 1 is shown in FIG. 8, and rotation directions of the constellation rotation are shown by arrows in FIG. 8.

Figure 9:
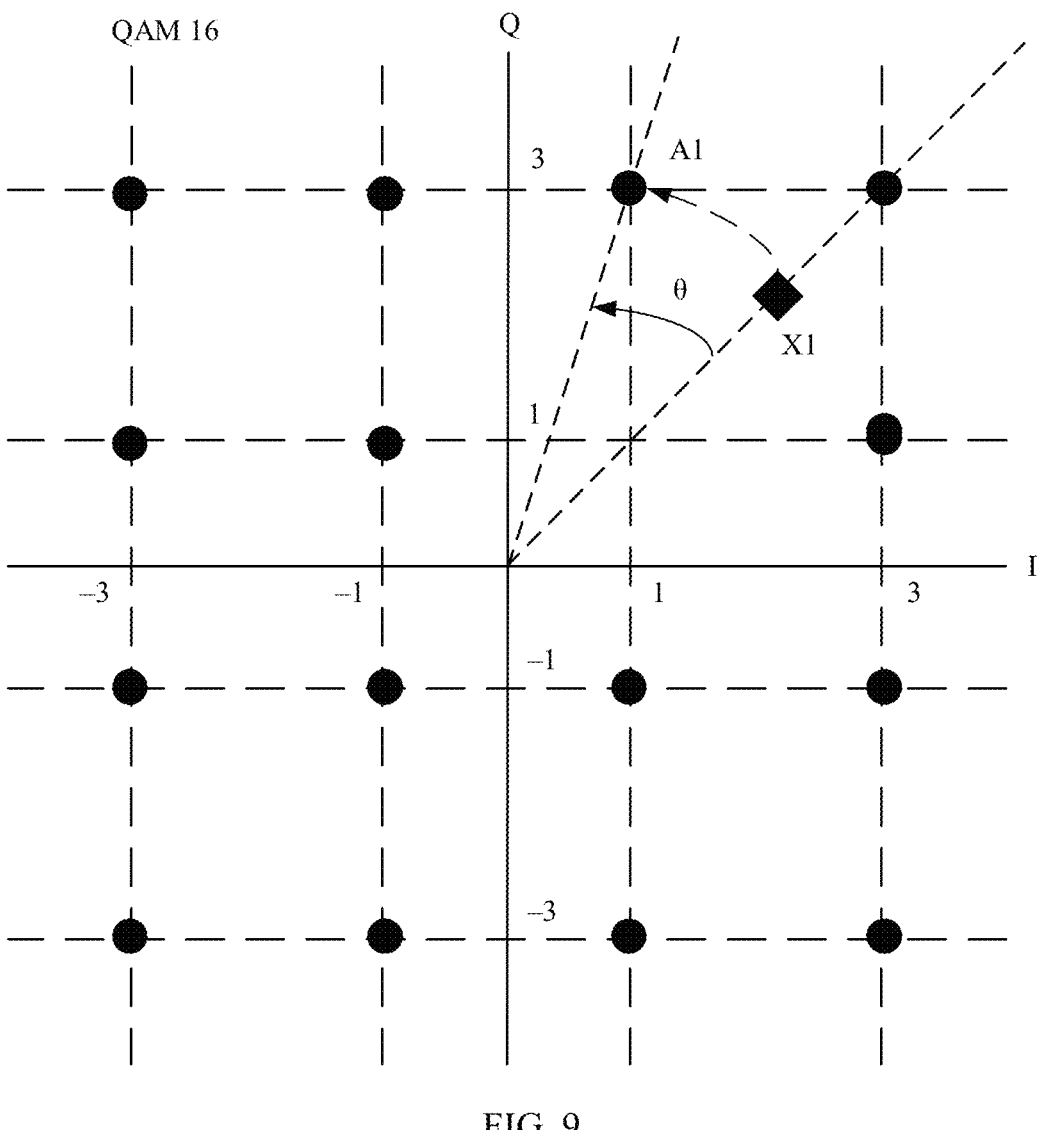
FIG. 9 is a diagram of a constellation rotation scenario according to an embodiment of the disclosure.

An angle of the constellation rotation is equal to a first angle. The first angle is greater than or equal to the following angle:

a minimum angle by which a symbol of a modulation order of $2^X$ rotates clockwise or counterclockwise on the constellation diagram when the symbol of the modulation order of $2^X$ encounters the $1^{st}$ symbol of a modulation order of $2^{2X}$. As shown in FIG. 9, a minimum angle by which a symbol X1 obtained through QPSK modulation rotates counterclockwise on the constellation diagram when the symbol X1 encounters the $1^{st}$ symbol of QAM 16 is used as an example. For example, the first angle satisfies:

$$\theta = \frac{\pi}{2} \times n \pm \sin^{-1}\left(\frac{1}{\sqrt{a}}\right) \qquad \text{Formula (4)}$$

θ indicates the first angle, $$\sin^{-1}\left(\frac{1}{\sqrt{a}}\right)$$

indicates the minimum angle by which a symbol of the modulation order of $2^X$ rotates clockwise or counterclockwise on the constellation diagram when the symbol of the modulation order of $2^X$ encounters the $1^{st}$ symbol of the modulation order of $2^{2X}$, π indicates pi, n indicates an integer greater than or equal to 0, $\sin^{-1}$ indicates an arc sine, and $\sqrt{a}$ indicates an energy normalization constant of the symbol whose modulation order is $2^{2X}$.

For example, when the modulated symbol whose modulation order is $2^X$ is a symbol obtained through QPSK modulation, the modulated symbol whose modulation order is $2^{2X}$ is a symbol obtained through QAM 16. A value of the energy normalization constant $\sqrt{a}$ is $\sqrt{5}$, and the first angle satisfies:

$$\theta = \frac{\pi}{2} \times n \pm \sin^{-1}\left(\frac{1}{\sqrt{5}}\right).$$

For another example, when the modulated symbol whose modulation order is $2^X$ is a symbol obtained through QAM 16, the modulated symbol whose modulation order is $2^{2X}$ is a symbol obtained through QAM 256. The value of the energy normalization constant $\sqrt{a}$ is $\sqrt{17}$, and the first angle satisfies:

$$\theta = \frac{\pi}{2} \times n \pm \sin^{-1}\left(\frac{1}{\sqrt{17}}\right).$$

For another example, when the modulated symbol whose modulation order is $2^X$ is a symbol obtained through QAM 64, the modulated symbol whose modulation order is $2^{2X}$ is a symbol obtained through QAM 4096. The value of the energy normalization constant $\sqrt{a}$ is $\sqrt{65}$, and the first angle satisfies:

$$\theta = \frac{\pi}{2} \times n \pm \sin^{-1}\left(\frac{1}{\sqrt{65}}\right).$$

For another example, when the modulated symbol whose modulation order is $2^X$ is a symbol obtained through QAM 256, the modulated symbol whose modulation order is $2^{2X}$ is a symbol obtained through QAM 65536. The value of the energy normalization constant $\sqrt{a}$ is $\sqrt{257}$, and the first angle satisfies:

$$\theta = \frac{\pi}{2} \times n \pm \sin^{-1}\left(\frac{1}{\sqrt{257}}\right).$$

In this way, the transmit end device can obtain the modulated symbol 2 in a constellation rotation manner. An in-phase component of the modulated symbol 2 is used as a component in the first sequence, and a quadrature component of the modulated symbol 2 is used as a component in the second sequence. Alternatively, on the contrary, a quadrature component of the modulated symbol 2 is used as a component in the first sequence, and an in-phase component of the modulated symbol 2 is used as a component in the second sequence. In this way, the transmit end device can determine two components corresponding to the first bit set, namely, one component in the first sequence and one component in the second sequence.

It should be understood that in S503c and S503d, only the first bit set is used as an example to describe the implementation process of S503. For a processing process of another bit set in the N bit sets, refer to S503c and S503d, to obtain another component in the first sequence and another component in the second sequence. Details are not described herein again.

S504: The transmit end device performs interleaving processing on the first sequence, to obtain a third sequence.

The interleaving processing may be understood as exchanging positions of at least two components in the first sequence. In the first sequence, to-be-exchanged positions are randomly determined, so that channel characteristics of a fading channel become as even as possible, and the fading channel is closer to an AWGN channel. In the first sequence, positions of at least two components are interchanged. Certainly, in the first sequence, a larger quantity of components whose positions are interchanged is more conducive to smooth processing of a gain of the fading channel. In this way, the channel characteristics of the fading channel become more even. In the embodiment of the disclosure, only an example in which positions of all components in the first sequence are interchanged is used for description.

Figure 10:
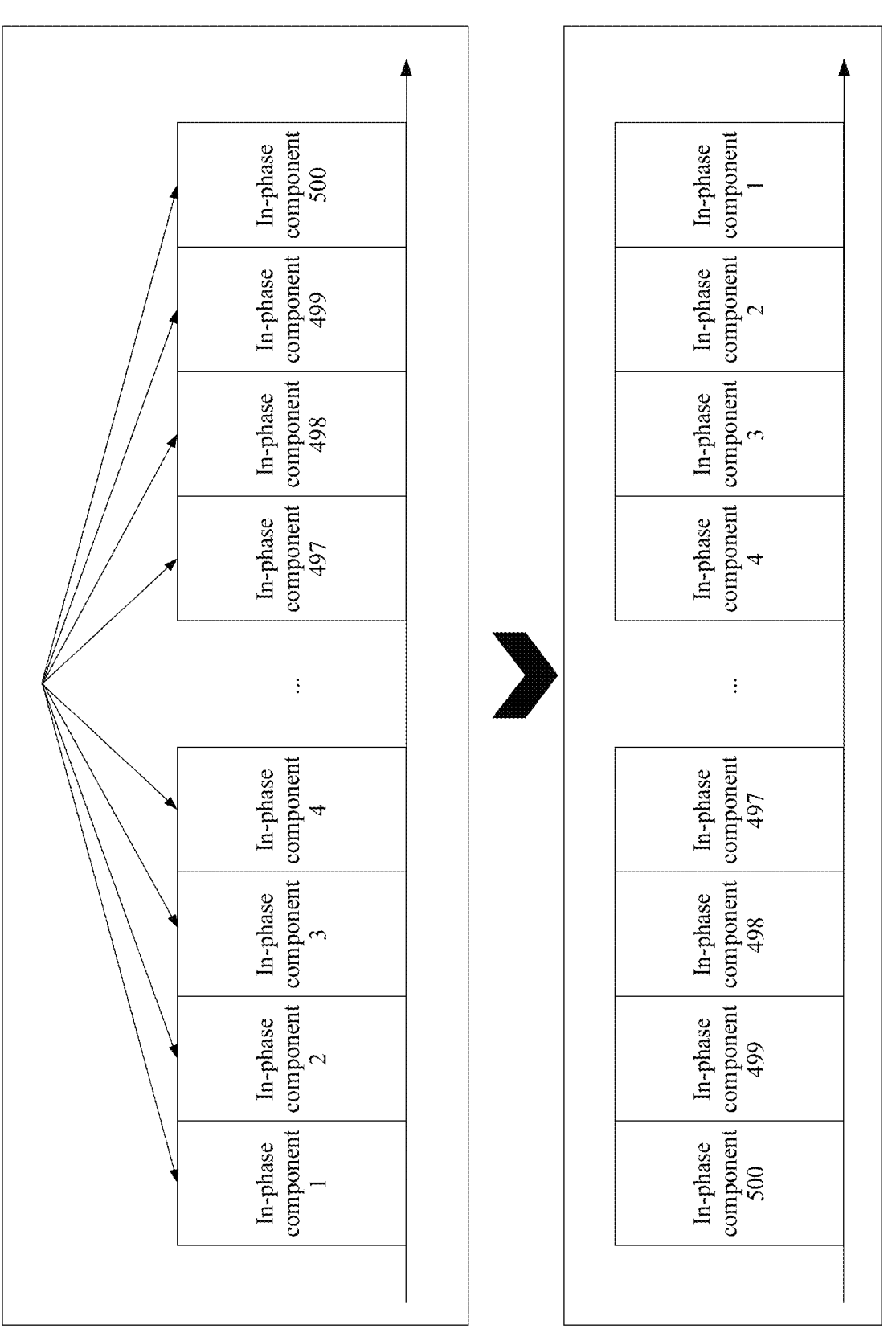
FIG. 10 is a diagram of an interleaving processing process according to an embodiment of the disclosure.

For example, the bit sequence including 1000 bits is still used as an example. When the bit sequence is divided into 500 bit sets, the first sequence includes 500 in-phase components. As shown in FIG. 10, before interleaving processing is performed, an arrangement order of the 500 in-phase components is shown in the $1^{st}$ block in FIG. 10, and from left to right, the in-phase components are sequentially: an in-phase component 1, an in-phase component 2, an in-phase component 3, an in-phase component 4, . . . , an in-phase component 497, an in-phase component 498, an in-phase component 499, and an in-phase component 500. For example, the interleaving processing includes: interchanging positions of the in-phase component 1 and the in-phase component 500 and interchanging positions of the in-phase component 2 and the in-phase component 499. Positions of other in-phase components may be deduced by analogy. Details are not described again. It should be understood that the interleaving processing in FIG. 10 is merely an example for description. To-be-exchanged positions are randomly determined, and there may also be another case of the to-be-exchanged positions. Details are not described herein again. After the interleaving processing is performed, the arrangement order of the 500 in-phase components is shown in the $2^{nd}$ block in FIG. 10, and from left to right, the in-phase components are sequentially: the in-phase component 500, the in-phase component 499, the in-phase component 498, the in-phase component 497, . . . , the in-phase component 4, the in-phase component 3, the in-phase component 2, and the in-phase component 1.

For example, when the first sequence includes the N in-phase components, the third sequence also includes the N in-phase components, and only an arrangement order of the N in-phase components is different from an arrangement order of the N in-phase components in the first sequence. When the first sequence includes the N quadrature component, the third sequence also includes the N quadrature components, and only an arrangement order of the N quadrature components is different from an arrangement order of the N quadrature components in the first sequence.

It should be understood that when S503 is implemented as S503$a$ and S503$b$, after performing S503$a$, the transmit end device may first perform S503$b$ and then perform S504, or may first perform S504 and then perform S503$b$, or may simultaneously perform S503$b$ and S504. This is not limited in the embodiment of the disclosure.

S505: The transmit end device determines a symbol sequence based on the second sequence and the third sequence.

For the second sequence, refer to the descriptions of S503. For the third sequence, refer to the descriptions of S504. Details are not described herein again.

The symbol sequence includes N QAM symbols. A modulation order of each of the N QAM symbols is equal to $2^{2X}$. X indicates the quantity of bits in each bit set in S502. For example, when each bit set includes two bits, each QAM symbol in the bit sequence is a symbol obtained through QAM 16, and the modulation order is 16. For another example, when each bit set includes four bits, each QAM symbol in the bit sequence is a symbol obtained through QAM 256, and the modulation order is 256. For another example, when each bit set includes six bits, each QAM symbol in the bit sequence is a symbol obtained through QAM 4096, and the modulation order is 4096.

For example, when the second sequence includes the N quadrature components, and the third sequence includes the N in-phase components, the transmit end device determines the $1^{st}$ QAM symbol in the symbol sequence based on the $1^{st}$ quadrature component in the second sequence and the $1^{st}$ in-phase component in the third sequence. The transmit end device determines the $2^{nd}$ QAM symbol in the symbol sequence based on the $2^{nd}$ quadrature component in the second sequence and the $2^{nd}$ in-phase component in the third sequence. Other QAM symbols in the symbol sequence may be deduced by analogy. Details are not described again.

S506: The transmit end device sends the symbol sequence to the receive end device. Correspondingly, the receive end device receives the symbol sequence from the transmit end device.

For the symbol sequence, refer to the descriptions of S505. Details are not described herein again.

The receive end device can communicate with the transmit end device. The receive end device may also be described as a receive end apparatus, a receiving end device, a receiving end apparatus, or the like. A name of the receive end device is not limited in the embodiment of the disclosure, and only the receive end device is used as an example for description. For example, FIG. 1 is still used as an example. During uplink transmission, the receive end device may be an access network device. During downlink transmission, the receive end device may be a terminal device.

For example, after performing resource mapping on the symbol sequence, the transmit end device sends the symbol sequence to the receive end device by using a mapped resource. Correspondingly, the receive end device receives the symbol sequence from the transmit end device by using the mapped resource.

It should be understood that the symbol sequence in S506 is transmitted in a real environment. Therefore, a channel that the symbol sequence passes through is the foregoing fading channel. For details, refer to the descriptions of the term explanation part. Details are not described herein again.

S507: The receive end device determines a fourth sequence and a fifth sequence based on the symbol sequence.

The fourth sequence includes in-phase components of the N QAM symbols, and the fifth sequence includes quadrature components of the N QAM symbols. Alternatively, the fourth sequence includes quadrature components of the N QAM symbols, and the fifth sequence includes in-phase components of the N QAM symbols.

For example, when the fourth sequence includes the N in-phase components, and the fifth sequence includes the N quadrature components, the receive end device determines the $1^{st}$ in-phase component in the fourth sequence and the $1^{st}$ quadrature component in the fifth sequence based on the $1^{st}$ QAM symbol in the symbol sequence. The receive end device determines the $2^{nd}$ in-phase component in the fourth sequence and the $2^{nd}$ quadrature component in the fifth sequence based on the $2^{nd}$ QAM symbol in the symbol sequence. Other components in the fourth sequence and other components in the fifth sequence may be deduced by analogy. Details are not described again.

It should be understood that when the first sequence includes the N in-phase components, the components in the fourth sequence are also in-phase components, and when the first sequence includes the N quadrature components, the components in the fourth sequence are also quadrature components, to facilitate deinterleaving processing.

S508: The receive end device performs deinterleaving processing on the fourth sequence, to obtain a sixth sequence.

The deinterleaving processing is an inverse process of interleaving processing, and may also be understood as exchanging positions of at least two components in the fourth sequence. To-be-exchanged positions in the fourth sequence are the same as the exchanged positions in the first sequence, to restore an arrangement position of each component.

For example, 500 in-phase components are still used as an example. Before deinterleaving processing is performed, an arrangement order of the 500 in-phase components, from left to right, is: the in-phase component 1, the in-phase component 2, the in-phase component 3, the in-phase component 4, . . . , the in-phase component 497, the in-phase component 498, the in-phase component 499, and the in-phase component 500. The deinterleaving processing in S508 is an inverse process of the interleaving processing in S504. Therefore, the deinterleaving processing includes: interchanging positions of the in-phase component 1 and the in-phase component 500 and interchanging positions of the in-phase component 2 and the in-phase component 499. Positions of other in-phase components may be deduced by analogy. Details are not described again. After the deinterleaving processing is performed, the arrangement order of the 500 in-phase components, from left to right, is: the in-phase component 500, the in-phase component 499, the in-phase component 498, the in-phase component 497, . . . , the in-phase component 4, the in-phase component 3, the in-phase component 2, and the in-phase component 1.

S509: The receive end device performs joint demodulation on the fifth sequence and the sixth sequence, to obtain N bit sets.

For the fifth sequence, refer to the descriptions of S507. For the sixth sequence, refer to the descriptions of S508. Details are not described herein again. For the N bit sets, refer to the descriptions of S502. Details are not described herein again.

For example, the receive end device performs joint demodulation based on the $1^{st}$ quadrature component in the fifth sequence and the $1^{st}$ in-phase component in the sixth sequence, to obtain the $1^{st}$ bit set in the N bit sets. The receive end device performs joint demodulation based on the $2^{nd}$ quadrature component in the fifth sequence and the $2^{nd}$ in-phase component in the sixth sequence, to obtain the $2^{nd}$ bit set in the N bit sets. A process of determining another bit set in the N bit sets is not described again. For example, 500 bit sets are still used as an example, and each bit set includes two bits. For example, bits in a bit set may be denoted as $b_0$ and $b_1$. A value of the bit $b_0$ is determined based on $LLR_{b0}$. $LLR_{b0}$ satisfies:

$$LLR_{b0} = \ln \frac{P\left(y_i \mid x_i = \frac{3}{\sqrt{5}}\right)P\left(y_q \mid x_q = \frac{-1}{\sqrt{5}}\right) + P\left(y_i \mid x_i = \frac{1}{\sqrt{5}}\right)P\left(y_q \mid x_q = \frac{3}{\sqrt{5}}\right)}{P\left(y_i \mid x_i = \frac{-3}{\sqrt{5}}\right)P\left(y_q \mid x_q = \frac{1}{\sqrt{5}}\right) + P\left(y_i \mid x_i = \frac{-1}{\sqrt{5}}\right)P\left(y_q \mid x_q = \frac{-3}{\sqrt{5}}\right)}$$

Formula (5)

Formula (5) is calculated based on mapping relationships in Table 2 and Table 3, and $LLR_{b0}$ indicates a log-likelihood ratio of the bit $b_0$. It is assumed that when values of bits $b_0$ and $b_1$ are 0 and $$0, P\left(y_i \mid x_i = \frac{3}{\sqrt{5}}\right)$$

indicates that when an in-phase component $x_i$ of a sent QAM symbol is $$\frac{3}{\sqrt{5}},$$

22 an in-phase component $y_i$ of a received QAM symbol is a likelihood probability of $$\frac{3}{\sqrt{5}};$$

and $$P\left(y_q \mid x_q = \frac{-1}{\sqrt{5}}\right)$$

indicates that when an in-phase component $x_q$ of the sent QAM symbol is $$\frac{-1}{\sqrt{5}},$$

an in-phase component $y_q$ of the received QAM symbol is a likelihood probability of $$\frac{-1}{\sqrt{5}}.$$

It is assumed that when values of bits $b_0$ and $b_1$ are 0 and $$1, P\left(y_i \mid x_i = \frac{1}{\sqrt{5}}\right)$$

indicates that when an in-phase component $x_i$ of a sent QAM symbol is $$\frac{1}{\sqrt{5}},$$

an in-phase component $y_i$ of a received QAM symbol is a likelihood probability of $$\frac{1}{\sqrt{5}};$$

and $$P\left(y_q \mid x_q = \frac{3}{\sqrt{5}}\right)$$

indicates that when an in-phase component $x_q$ of the sent QAM symbol is $$\frac{3}{\sqrt{5}},$$

an in-phase component $y_q$ of the received QAM symbol is a likelihood probability of $$\frac{3}{\sqrt{5}}.$$

$$\frac{-1}{\sqrt{5}};$$

It is assumed that when values of bits $b_0$ and $b_1$ are 1 and and $$1, P\left(y_i \mid x_i = \frac{-3}{\sqrt{5}}\right)$$

$$P\left(y_q \middle| x_q = \frac{-3}{\sqrt{5}}\right)$$

indicates that when an in-phase component $x_i$ of a sent QAM symbol is indicates that when an in-phase component $x_q$ of the sent QAM symbol is $$\frac{-3}{\sqrt{5}},$$

$$\frac{-3}{\sqrt{5}},$$

an in-phase component $y_i$ of a received QAM symbol is a likelihood probability of and in-phase component $y_q$ of the received QAM symbol is a likelihood probability of $$\frac{-3}{\sqrt{5}};$$

$$\frac{-3}{\sqrt{5}}.$$

and

A value of the bit $b_1$ is determined based on $LLR_{b1}$. $LLR_{b1}$ satisfies:

$$P\left(y_q \middle| x_q = \frac{1}{\sqrt{5}}\right)$$

$$LLR_{b1} = \ln \frac{P\left(y_i \middle| x_i = \frac{3}{\sqrt{5}}\right)P\left(y_q \middle| x_q = \frac{-1}{\sqrt{5}}\right) + P\left(y_i \middle| x_i = \frac{-1}{\sqrt{5}}\right)P\left(y_q \middle| x_q = \frac{-3}{\sqrt{5}}\right)}{P\left(y_i \middle| x_i = \frac{1}{\sqrt{5}}\right)P\left(y_q \middle| x_q = \frac{3}{\sqrt{5}}\right) + P\left(y_i \middle| x_i = \frac{-3}{\sqrt{5}}\right)P\left(y_q \middle| x_q = \frac{-1}{\sqrt{5}}\right)} \qquad \text{Formula (6)}$$

indicates that when an in-phase component $x_q$ of the sent QAM symbol is $$\frac{1}{\sqrt{5}},$$

an in-phase component $y_q$ of the received QAM symbol is a likelihood probability of Formula (6) is calculated based on mapping relationships in Table 2 and Table 3, and $LLR_{b1}$ indicates a log-likelihood ratio of the bit $b_1$. It is assumed that when values of bits $b_0$ and $b_1$ are 0 and $$\frac{1}{\sqrt{5}}.$$

$$0, P\left(y_i \middle| x_i = \frac{3}{\sqrt{5}}\right)$$

It is assumed that when values of bits $b_0$ and $b_1$ are 1 and indicates that when an in-phase component $x_i$ of a sent QAM symbol is $$0, P\left(y_i \middle| x_i = \frac{-1}{\sqrt{5}}\right)$$

$$\frac{3}{\sqrt{5}},$$

indicates that when an in-phase component $x_i$ of a sent QAM symbol is an in-phase component $y_i$ of a received QAM symbol is a likelihood probability of $$\frac{-1}{\sqrt{5}},$$

$$\frac{3}{\sqrt{5}};$$

an in-phase component $y_i$ of a received QAM symbol is a likelihood probability of and $$P\left(y_q \middle| x_q = \frac{-1}{\sqrt{5}}\right)$$

indicates that when an in-phase component $x_q$ of the sent QAM symbol is $$\frac{-1}{\sqrt{5}},$$

an in-phase component $y_q$ of the received QAM symbol is a likelihood probability of $$\frac{-1}{\sqrt{5}}.$$

It is assumed that when values of bits $b_0$ and $b_1$ are 1 and $$0, P\left(y_i \middle| x_i = \frac{-1}{\sqrt{5}}\right)$$

indicates that when an in-phase component $x_i$ of a sent QAM symbol is $$\frac{-1}{\sqrt{5}},$$

an in-phase component $y_i$ of a received QAM symbol is a likelihood probability of $$\frac{-1}{\sqrt{5}};$$

and $$P\left(y_q \middle| x_q = \frac{-3}{\sqrt{5}}\right)$$

indicates that when an in-phase component $x_q$ of the sent QAM symbol is $$\frac{-3}{\sqrt{5}},$$

an in-phase component $y_q$ of the received QAM symbol is a likelihood probability of $$\frac{-3}{\sqrt{5}}.$$

It is assumed that when values of bits $b_0$ and $b_1$ are 0 and 1, $$P\left(y_i \middle| x_i = \frac{1}{\sqrt{5}}\right)$$

indicates that when an in-phase component $x_i$ of the sent QAM symbol is $$\frac{1}{\sqrt{5}},$$

an in-phase component $y_i$ of the received QAM symbol is a likelihood probability of $$\frac{1}{\sqrt{5}};$$

and $$P\left(y_q \middle| x_q = \frac{3}{\sqrt{5}}\right)$$

indicates that when an in-phase component $x_q$ of the sent QAM symbol is $$\frac{3}{\sqrt{5}},$$

an in-phase component $y_q$ of the received QAM symbol is a likelihood probability of $$\frac{3}{\sqrt{5}}.$$

It is assumed that when values of bits $b_0$ and $b_1$ are 1 and $$1, P\left(y_i \middle| x_i = \frac{-3}{\sqrt{5}}\right)$$

indicates that when an in-phase component $x_i$ of a sent QAM symbol is $$\frac{-3}{\sqrt{5}},$$

an in-phase component $y_i$ of a received QAM symbol is a likelihood probability of $$\frac{-3}{\sqrt{5}};$$

and $$P\left(y_q \middle| x_q = \frac{1}{\sqrt{5}}\right)$$

indicates that when an in-phase component $x_q$ of the sent QAM symbol is $$\frac{1}{\sqrt{5}},$$

an in-phase component $y_q$ of the received QAM symbol is a likelihood probability of $$\frac{1}{\sqrt{5}}.$$

The receive end device may obtain a log-likelihood ratio LLR of each of the N bit sets by repeating the foregoing process.

It should be noted that in S504, an example in which interleaving processing is performed on only one sequence, namely, the first sequence, and interleaving processing is not performed on the second sequence is used for description. Certainly, interleaving processing may alternatively be performed on the second sequence, that is, interleaving processing is performed on the second sequence, and interleaving processing is not performed on the first sequence. In other words, S504 may also be replaced with that the transmit end device performs interleaving processing on the second sequence, to obtain a seventh sequence. Correspondingly, S505 is replaced with that the transmit end device determines a symbol sequence based on the first sequence and the seventh sequence. S508 is replaced with that the transmit end device performs deinterleaving processing on the fifth sequence, to obtain an eighth sequence. S509 is replaced with that the transmit end device performs joint demodulation on the fourth sequence and the eighth sequence, to obtain N bit sets.

Alternatively, in the embodiment of the disclosure, interleaving processing may be performed on two sequences in S504. In other words, S504 may be replaced with that the transmit end device performs interleaving processing on the first sequence, to obtain a third sequence, and performs interleaving processing on the second sequence, to obtain a seventh sequence. Correspondingly, S505 is replaced with that the transmit end device determines a symbol sequence based on the third sequence and the seventh sequence. Details are not described herein again. S508 is replaced with that the transmit end device performs deinterleaving processing on the fourth sequence, to obtain a sixth sequence, and performs deinterleaving processing on the fifth sequence, to obtain an eighth sequence. S509 is replaced with that the transmit end device performs joint demodulation on the sixth sequence and the eighth sequence, to obtain N bit sets.

Figure 11:
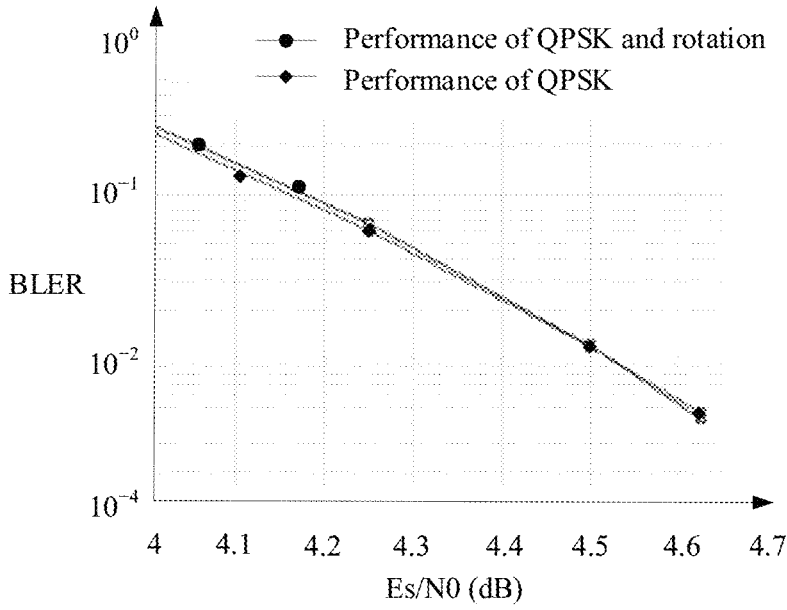
FIG. 11 is a simulation result diagram according to an embodiment of the disclosure.

The following describes a simulation result. FIG. 11 shows simulation results under an AWGN channel, and FIG. 12 to FIG. 14 show simulation results of a 3rd generation partnership project-extended typical urban model (3GPP-ETU).

For example, an AWGN channel is used as an example, that is, the symbol sequence in S506 is transmitted through the AWGN channel. FIG. 11 shows simulation results obtained when information is transmitted by using the foregoing implementation 1 and implementation 2 (namely, the foregoing two implementations in S503). In FIG. 11, a horizontal axis is a symbol signal-to-noise ratio (Es/N0), and a vertical axis is a block error rate (BLER). An example in which each bit set includes two bits is used. In implementation 1, each bit set is mapped twice. A performance result of this manner is shown by a broken line marked with rhombuses in FIG. 11. In implementation 2, after QPSK modulation is performed on each bit set, constellation rotation is performed. A performance result of this manner is shown by a broken line marked with black dots in FIG. 11. It can be learned from FIG. 11 that, an AWGN channel is used as an example, and in a case of a same symbol signal-to-noise ratio (Es/N0), a BLER of implementation 1 is close to a BLER of implementation 2. It may also be understood that performance of implementation 1 is the same as that of implementation 2.

Figure 12:
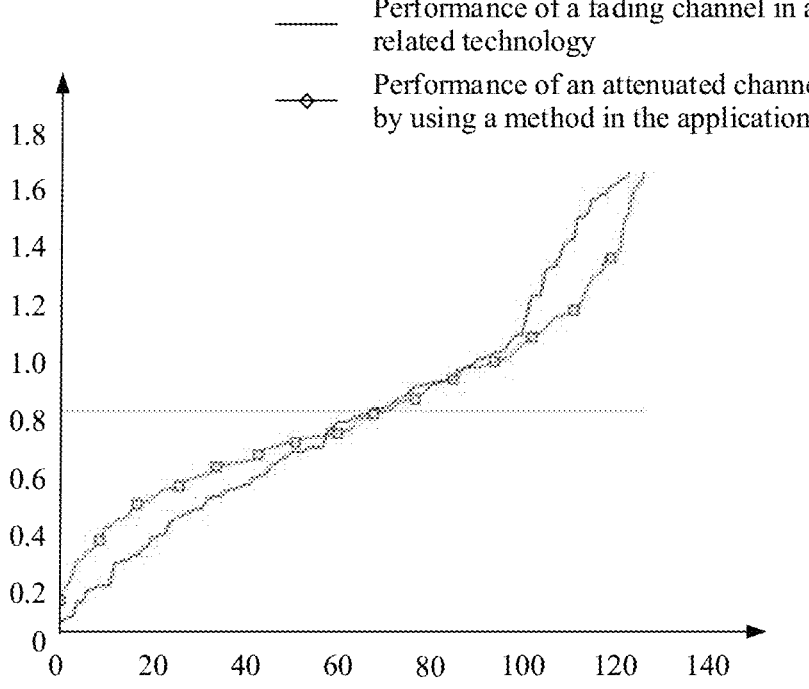
FIG. 12 is another simulation result diagram according to an embodiment of the disclosure.

FIG. 12 shows channel gains of different pilot points of an fading channel. In FIG. 12, a vertical axis is a modulus of a channel response, and a horizontal axis is an order of moduli of the channel response. It can be learned from a broken line, in FIG. 12, that is not marked with rhombuses that a channel gain of an fading channel in a related technology changes greatly. After the communication method 500 in the embodiment of the disclosure is used, the channel gain of the fading channel changes smoothly. Especially, near an average value (namely, 0.8) of channel gains, the channel gain of the fading channel changes very smoothly, so that interference to the symbol sequence in a transmission process is averaged. This helps improve information transmission reliability.

Figure 13:
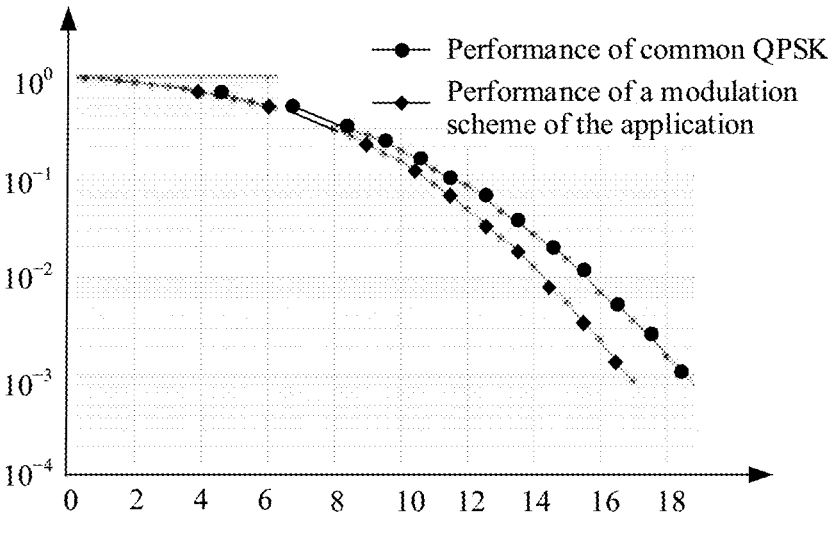
FIG. 13 is still another simulation result diagram according to an embodiment of the disclosure.
Figure 14:
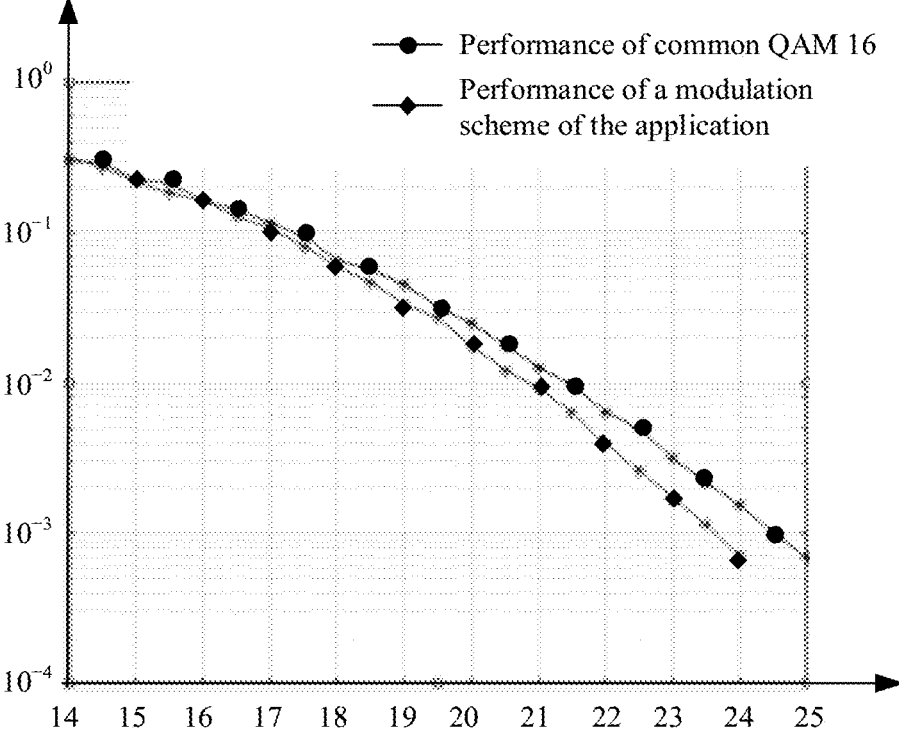
FIG. 14 is still another simulation result diagram according to an embodiment of the disclosure.

FIG. 13 is a performance simulation diagram of a modulation scheme. In FIG. 13, a vertical axis is a packet error rate (PER), and a horizontal axis is a signal-to-noise ratio (SNR). In the modulation scheme in FIG. 13, one modulated symbol may carry two-bit information. The modulation scheme in FIG. 13 includes two types. The first type is common QPSK, and the second type is the modulation scheme shown in the communication method 500 in the disclosure, in which each bit set includes two bits. A broken line marked with black dots in FIG. 13 shows a PER performance result of the common QPSK. A broken line marked with rhombuses in FIG. 13 shows a PER performance result of the modulation scheme provided in the disclosure. In other words, a symbol sequence of QAM 16 is obtained by performing mapping twice, or QPSK modulation is performed first, and then constellation rotation is performed on a symbol obtained through QPSK modulation, to obtain a symbol sequence of QAM 16. It can be learned from FIG. 13 that when PERs are the same, compared with the common QPSK, an SNR of the modulation scheme shown in the disclosure has a gain of 1.8 dB.

FIG. 14 is a performance simulation diagram of still another modulation scheme. In FIG. 14, a vertical axis is a PER, and a horizontal axis is an SNR. In the modulation scheme in FIG. 14, one modulated symbol may carry four-bit information. The modulation scheme in FIG. 14 includes two types. The first type is common QAM 16, and the second type is the modulation scheme, shown in the communication method 500 in the disclosure, in which each bit set includes four bits. A broken line marked with black dots in FIG. 14 shows a PER performance result of the common QAM 16. A broken line marked with rhombuses in FIG. 14 shows a PER performance result of the modulation scheme provided in the disclosure. In other words, a symbol sequence of QAM 256 is obtained by performing mapping twice, or QAM 16 is performed first, and then constellation rotation is performed on a symbol obtained through QAM 16, to obtain a symbol sequence of QAM 256. It can be learned from FIG. 14 that when PERs are the same, compared with the common QAM 16, an SNR of the modulation scheme shown in the disclosure has a gain of 1.1 dB.

The foregoing mainly describes the solutions provided in embodiments of the disclosure from a perspective of interaction between network elements. Correspondingly, an embodiment of the disclosure further provides a communication apparatus. The communication apparatus may be the network element in the method embodiments, or an apparatus including the foregoing network element, or a component that can be used in the network element. It can be understood that to implement the foregoing functions, the communication apparatus includes a corresponding hardware structure and/or software module for performing each function. A person skilled in the art should easily be aware that, in combination with units and algorithm steps of the examples described in embodiments disclosed in this specification, the disclosure may be implemented by hardware or a combination of hardware and computer software. Whether a function is performed by hardware or hardware driven by computer software depends on particular disclosures and design constraints of the technical solutions. A person skilled in the art may use different methods to implement the described functions for each particular disclosure, but it should not be considered that the implementation goes beyond the scope of the disclosure.

Figure 15:
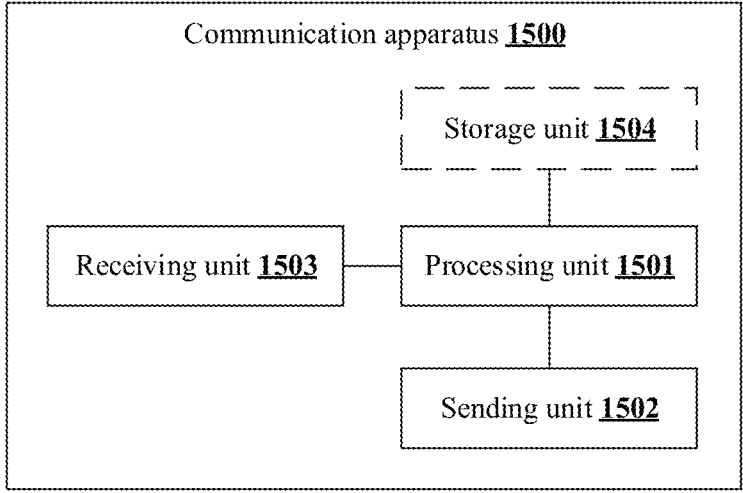
FIG. 15 is a diagram of a structure of a communication apparatus according to an embodiment of the disclosure.

For example, FIG. 15 is a diagram of a structure of a communication apparatus 1500. The communication apparatus 1500 includes a processing unit 1501, a sending unit 1502, and a receiving unit 1503.

In an example, the communication apparatus 1500 is a transmit end device. The processing unit 1501 is configured to support the transmit end device in performing S501, S502, S503, S504, and S505 in FIG. 5, and/or another processing operation that needs to be performed by the transmit end device in the embodiment of the disclosure. The sending unit 1502 is configured to support the transmit end device in performing S506 in FIG. 5, and/or another sending operation that needs to be performed by the transmit end device in the embodiment of the disclosure. The receiving unit 1503 is configured to support the transmit end device in performing another receiving operation that needs to be performed by the transmit end device.

In another example, the communication apparatus 1500 is a receive end device. The processing unit 1501 is configured to support the receive end device in performing S507, S508, and S509 in FIG. 5, and/or another processing operation that needs to be performed by the receive end device in the embodiment of the disclosure. The receiving unit 1503 is configured to support the receive end device in performing S506 in FIG. 5, and/or another receiving operation that needs to be performed by the receive end device in the embodiment of the disclosure. The sending unit 1502 is configured to support the receive end device in performing another sending operation that needs to be performed by the receive end device.

Optionally, the communication apparatus 1500 may further include a storage unit 1504, configured to store program code and data of the communication apparatus. The data may include but is not limited to original data, intermediate data, or the like.

The processing unit 1501 may be a processor or a controller, for example, may be a CPU, a general-purpose processor, an application-specific integrated circuit (ASIC), a field programmable gate array (FPGA) or another programmable logic device, a transistor logic device, a hardware component, or any combination thereof. The processing unit 1501 may implement or execute various example logical blocks, modules, and circuits described with reference to content disclosed in the disclosure. Alternatively, the processor may be a combination of processors implementing a computing function, for example, a combination including one or more microprocessors, or a combination of a DSP and a microprocessor.

The sending unit 1502 may be a communication interface, a transmitter, a transmitter circuit, or the like. The communication interface is a general term. During implementation, the communication interface may include a plurality of interfaces, for example, may include an interface between a transmit end device and a receive end device and/or another interface.

The receiving unit 1503 may be a communication interface, a receiver, a receiver circuit, or the like. The communication interface is a general term. During implementation, the communication interface may include a plurality of interfaces, for example, may include an interface between a transmit end device and a receive end device and/or another interface.

The sending unit 1502 and the receiving unit 1503 may be physically or logically implemented as a same unit.

The storage unit 1504 may be a memory.

Figure 16:
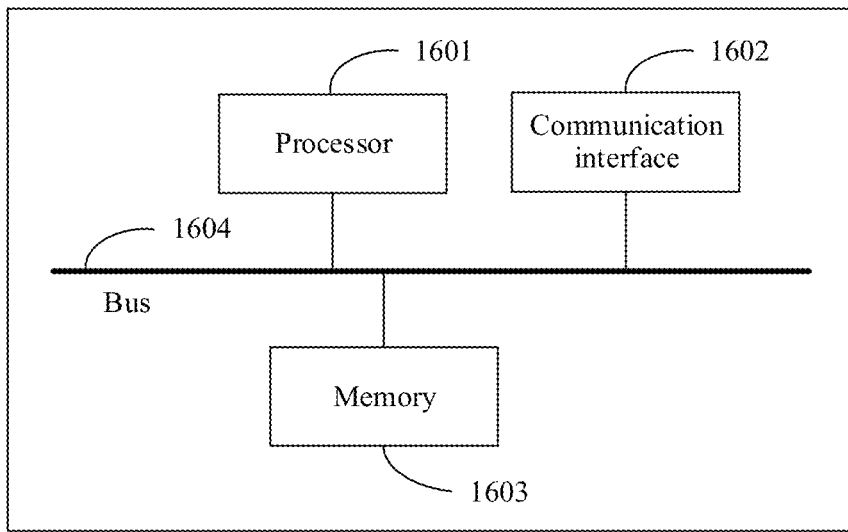
FIG. 16 is a diagram of a structure of another communication apparatus according to an embodiment of the disclosure.

When the processing unit 1501 is a processor, the sending unit 1502 and the receiving unit 1503 are communication interfaces, and the storage unit 1504 is a memory, the communication apparatus in the embodiment of the disclosure may be shown in FIG. 16.

Refer to FIG. 16. The communication apparatus includes a processor 1601, a communication interface 1602, and a memory 1603. Optionally, the communication apparatus may further include a bus 1604. The communication interface 1602, the processor 1601, and the memory 1603 may be connected to each other through the bus 1604. The bus 1604 may be a peripheral component interconnect (PCI) bus, an extended industry standard architecture (EISA) bus, or the like. The bus 1604 may be classified into an address bus, a data bus, a control bus, and the like. For ease of description, the bus in FIG. 16 is indicated by only one thick line, but it does not indicate that there is only one bus or one type of bus.

Optionally, an embodiment of the disclosure further provides a computer program product carrying computer instructions. When the computer instructions are run on a computer, the computer is enabled to perform the method described in the foregoing embodiments.

Optionally, an embodiment of the disclosure further provides a computer-readable storage medium. The computer-readable storage medium stores computer instructions. When the computer instructions are run on a computer, the computer is enabled to perform the method described in the foregoing embodiments.

Optionally, an embodiment of the disclosure further provides a chip, including a processing circuit and a transceiver circuit. The processing circuit and the transceiver circuit are configured to implement the method described in the foregoing embodiments. The processing circuit is configured to perform a processing action in a corresponding method, and the transceiver circuit is configured to perform a receiving/transmitting action in the corresponding method.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some procedures or functions in embodiments of the disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in the disclosure, it should be understood that the disclosed system, apparatus, and method may be implemented in other manners. For example, the described apparatus embodiment is merely an example. For example, division into the modules is merely logical function division, and there may be another division manner during actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic or other forms.

The units described as separate parts may or may not be physically separate, and parts displayed as units may or may not be physical units, that is, may be located at one position, or may be distributed on a plurality of devices. Some or all of the units may be selected based on actual requirements to achieve the objectives of the solutions of embodiments.

Based on the descriptions of the implementations, a person skilled in the art may clearly understand that the disclosure may be implemented by software in addition to necessary universal hardware or by hardware only. In most circumstances, the former is a preferred implementation. Based on such an understanding, the technical solutions of the disclosure essentially or the part making contributions may be implemented in a form of a software product. The computer software product is stored in a readable storage medium, such as a floppy disk, a hard disk, or an optical disc of a computer, and includes several instructions for instructing a computer device (which may be a personal computer, a server, or a network device) to perform the methods described in embodiments of the disclosure.

The foregoing descriptions are merely implementations of the disclosure, but are not intended to limit the protection scope of the disclosure. Any variation or replacement within the technical scope disclosed in the disclosure shall fall within the protection scope of the disclosure. Therefore, the protection scope of the disclosure shall be subject to the protection scope of the claims.

What is claimed is:

1. A communication method applied to a transmit end, the method comprising:
determining, based on N bit sets, a first sequence and a second sequence that are obtained through quadrature amplitude modulation (QAM), the first sequence comprising N in-phase components and the second sequence comprising N quadrature components, or the first sequence comprising N quadrature components and the second sequence comprising N in-phase components, N being an integer greater than or equal to 2, a first symbol is obtained by rotating a second symbol by a first angle on a constellation diagram, the rotation is performed clockwise or counterclockwise using an origin of a constellation diagram as a circle center, and the first angle is greater than or equal to a minimum angle by which a symbol of the second modulation order rotates clockwise or counterclockwise on the constellation diagram when the symbol of the second modulation order encounters the first symbol of the first modulation order;
performing interleaving processing on the first sequence to obtain a third sequence; and
sending, to a receive end device, a symbol sequence determined based on the second sequence and the third sequence, the symbol sequence comprising N QAM symbols.

2. The method according to claim 1, wherein:
the N in-phase components are determined based on a first codebook, wherein the first codebook indicates at least mapping relationships between the bit sets and the in-phase components; and
the N quadrature components are determined based on a second codebook, wherein the second codebook indicates at least mapping relationships between the bit sets and the quadrature components.

3. The method according to claim 1, wherein:
the N in-phase components comprise in-phase components of N first symbols;
the N quadrature components comprise quadrature components of the N first symbols;
a first modulation order of the first symbol is a square of the second modulation order of the second symbol; and
the second symbol is obtained by modulating the bit sets.

4. The method according to claim 3, wherein the first angle satisfies:

$$\theta = \frac{\pi}{2} \times n \pm \sin^{-1}\left(\frac{1}{\sqrt{a}}\right),$$

wherein
θ indicates the first angle, $$\sin^{-1}\left(\frac{1}{\sqrt{a}}\right)$$

indicates the minimum angle, π indicates pi, n indicates an integer greater than or equal to 0, $\sin^{-1}$ indicates an arc sine, and $\sqrt{a}$ indicates an energy normalization constant of the first symbol.

5. The method according to claim 1, wherein the bit sets comprise X bits, a modulation order of the QAM symbol is $2^{2X}$, and X is a positive integer.

6. An apparatus, comprising:

a memory storing instructions; and at least one processor in communication with a memory storing instructions, the at least one processor configured, upon execution of the instructions, to cause the apparatus to perform the following steps:

determine, based on N bit sets, a first sequence and a second sequence that are obtained through quadrature amplitude modulation (QAM), the first sequence comprising N in-phase components and the second sequence comprising N quadrature components, or the first sequence comprising N quadrature components and the second sequence comprising N in-phase components, N being an integer greater than or equal to 2, a first symbol is obtained by rotating a second symbol by a first angle on a constellation diagram, the rotation is performed clockwise or counterclockwise using an origin of a constellation diagram as a circle center, and the first angle is greater than or equal to a minimum angle by which a symbol of the second modulation order rotates clockwise or counterclockwise on the constellation diagram when the symbol of the second modulation order encounters the first symbol of the first modulation order;

perform interleaving processing on the first sequence to obtain a third sequence; and send, to a receive end device, a symbol sequence determined based on the second sequence and the third sequence, the symbol sequence comprising N QAM symbols.

7. The apparatus according to claim 6, wherein:

the N in-phase components are determined based on a first codebook, wherein the first codebook indicates at least mapping relationships between the bit sets and the in-phase components; and the N quadrature components are determined based on a second codebook, wherein the second codebook indicates at least mapping relationships between the bit sets and the quadrature components.

8. The apparatus according to claim 6, wherein:

the N in-phase components comprise in-phase components of N first symbols; and the N quadrature components comprise quadrature components of the N first symbols;

a first modulation order of the first symbol is a square of the second modulation order of the second symbol; and the second symbol is obtained by modulating the bit sets.

9. The apparatus according to claim 8, wherein the first angle satisfies:

$$\theta = \frac{\pi}{2} \times n \pm \sin^{-1}\left(\frac{1}{\sqrt{a}}\right),$$

wherein

θ indicates the first angle, $$\sin^{-1}\left(\frac{1}{\sqrt{a}}\right)$$

indicates the minimum angle, π indicates pi, n indicates an integer greater than or equal to 0, $\sin^{-1}$ indicates an arc sine, and √a indicates an energy normalization constant of the first symbol.

10. The apparatus according to claim 6, wherein the bit sets comprise X bits, a modulation order of the QAM symbol is $2^{2X}$, and X is a positive integer.

11. A non-transitory computer-readable media storing computer instructions that configure at least one processor, upon execution of the instructions, to cause an apparatus comprising the processor to perform the following steps:

determine, based on N bit sets, a first sequence and a second sequence that are obtained through quadrature amplitude modulation (QAM), the first sequence comprising N in-phase components and the second sequence comprising N quadrature components, or the first sequence comprising N quadrature components and the second sequence comprising N in-phase components, N being an integer greater than or equal to 2, a first symbol is obtained by rotating a second symbol by a first angle on a constellation diagram, the rotation is performed clockwise or counterclockwise using an origin of a constellation diagram as a circle center, and the first angle is greater than or equal to a minimum angle by which a symbol of the second modulation order rotates clockwise or counterclockwise on the constellation diagram when the symbol of the second modulation order encounters the first symbol of the first modulation order;

perform interleaving processing on the first sequence to obtain a third sequence; and send, to a receive end device, a symbol sequence determined based on the second sequence and the third sequence, the symbol sequence comprising N QAM symbols.

12. The non-transitory computer-readable media according to claim 11, wherein:

the N in-phase components are determined based on a first codebook, wherein the first codebook indicates at least mapping relationships between the bit sets and the in-phase components; and the N quadrature components are determined based on a second codebook, wherein the second codebook indicates at least mapping relationships between the bit sets and the quadrature components.

13. The non-transitory computer-readable media according to claim 11, wherein:

the N in-phase components comprise in-phase components of N first symbols; and the N quadrature components comprise quadrature components of the N first symbols;

a first modulation order of the first symbol is a square of the second modulation order of the second symbol; and the second symbol is obtained by modulating the bit sets.

14. The non-transitory computer-readable media according to claim 13, wherein the first angle satisfies:

$$\theta = \frac{\pi}{2} \times n \pm \sin^{-1}\left(\frac{1}{\sqrt{a}}\right),$$

wherein

θ indicates the first angle, $$\sin^{-1}\left(\frac{1}{\sqrt{a}}\right)$$

indicates the minimum angle, $\pi$ indicates pi, n indicates an integer greater than or equal to 0, $\sin^{-1}$ indicates an arc sine, and $\sqrt{a}$ indicates an energy normalization constant of the first symbol.

15. The non-transitory computer-readable media according to claim 11, wherein the bit sets comprise X bits, a modulation order of the QAM symbol is $2^{2X}$, and X is a positive integer.

\* \* \* \* \*